(12) United States Patent
Smick

(10) Patent No.: US 9,494,250 B2
(45) Date of Patent: *Nov. 15, 2016

(54) VALVE WITH SYNC CAM

(71) Applicant: Mueller International, LLC, Atlanta, GA (US)

(72) Inventor: Stephen J. Smick, Oswego, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,742

(22) Filed: Dec. 19, 2014

(65) Prior Publication Data

US 2015/0102249 A1 Apr. 16, 2015

Related U.S. Application Data

(63) Continuation of application No. 13/741,329, filed on Jan. 14, 2013, now Pat. No. 8,944,085.

(51) Int. Cl.
*F16K 3/26* (2006.01)
*F16K 31/50* (2006.01)
(Continued)

(52) U.S. Cl.
CPC ............ *F16K 31/508* (2013.01); *F16H 25/00* (2013.01); *F16K 1/123* (2013.01); *F16K 3/265* (2013.01); *F16K 3/314* (2013.01); *F16K 3/316* (2013.01); *Y10T 137/0491* (2015.04); *Y10T 137/6106* (2015.04); *Y10T 137/86759* (2015.04); *Y10T 137/86807* (2015.04)

(58) Field of Classification Search
CPC ........................ F16K 3/316; F16K 3/314; F16K 31/508; F16K 3/24; Y10T 137/0318; Y10T 137/86759; Y10T 137/6106; Y10T 137/86807

USPC ............... 137/625.33, 625.3, 625.39, 315.4, 137/315.35, 219, 2, 12, 15.18, 15.21, 137/15.01; 251/266, 274, 129.11, 344
See application file for complete search history.

(56) References Cited

U.S. PATENT DOCUMENTS 1,462,110 A 7/1923 Hostetter et al.
1,687,317 A 10/1928 Archer
(Continued)

FOREIGN PATENT DOCUMENTS

JP 2000097354 4/2000

OTHER PUBLICATIONS

Smick, Stephen J.; Non-Final Office Action for U.S. Appl. No. 13/741,326, filed Jan. 14, 2013, mailed May 6, 2014, 12 pgs.
(Continued)

*Primary Examiner* — Marina Tietjen
*Assistant Examiner* — Umashankar Venkatesan
(74) *Attorney, Agent, or Firm* — Taylor English Duma LLP

(57) ABSTRACT

Valves include a valve body having an inner surface and an outer surface, the inner surface and the outer surface defining an inlet, an outlet, and a body cavity between the inlet and the outlet; a gate movably coupled to the valve body and moveable over a portion of the valve body at least partially between the inlet and the outlet, the gate including a cam stop; and a drive assembly, the drive assembly including a pair of drive lines, each drive line having a drive shaft, a first drive line of the pair of drive lines including a sync cam, the sync cam of the first drive line movably positioned on the drive shaft of the first drive line and positioned relative to the cam stop.

17 Claims, 21 Drawing Sheets

(51) Int. Cl.
*F16K 1/12* (2006.01)
*F16H 25/00* (2006.01)
*F16K 3/314* (2006.01)
*F16K 3/316* (2006.01)

(56) References Cited

U.S. PATENT DOCUMENTS

| | | | |
|---|---|---|---|
| 2,830,617 | A | 4/1958 | Brown |
| 3,605,787 | A | 9/1971 | Krogross et al. |
| 3,821,968 | A | 7/1974 | Barb |
| 4,036,248 | A | 7/1977 | Yoshimori et al. |
| 4,040,443 | A | 8/1977 | Okada et al. |
| 4,103,702 | A | 8/1978 | Duthion et al. |
| 4,244,388 | A | 1/1981 | Feiss |
| 4,375,821 | A | 3/1983 | Nanao |
| 4,508,138 | A | 4/1985 | Dixon |
| 4,512,359 | A | 4/1985 | Hinojosa et al. |
| 4,520,846 | A | 6/1985 | Dixon |
| 4,526,192 | A | 7/1985 | Dixon |
| 4,573,492 | A | 3/1986 | Tadokoro |
| 4,611,630 | A | 9/1986 | Muchow et al. |
| 4,635,678 | A | 1/1987 | Peterman et al. |
| 5,116,252 | A | 5/1992 | Hartman |
| 5,269,343 | A | 12/1993 | Trapp |
| 5,448,962 | A | 9/1995 | Moody |
| 5,490,535 | A | 2/1996 | Fromm |
| 5,503,176 | A | 4/1996 | Dunmire et al. |
| 5,509,437 | A | 4/1996 | Merrett |
| 5,584,314 | A | 12/1996 | Bron |
| 5,950,660 | A | 9/1999 | Hartman et al. |
| 6,681,792 | B2 | 1/2004 | Edward et al. |
| 8,944,085 | B2 | 2/2015 | Smick |
| 8,960,229 | B2 | 2/2015 | Smick |

OTHER PUBLICATIONS

Smick, Stephen J.; Notice of Allowance for U.S. Appl. No. 13/741,326, filed Jan. 14, 2013, mailed Sep. 17, 2014, 7 pgs.
Smick, Stephen J.; U.S. Patent Application entitled: Sleeve Valve With Sync Cam having U.S. Appl. No. 13/741,326, filed Jan. 14, 2013, 45 pgs.
Smick, Stephen J.; Non-Final Office action for U.S. Appl. No. 13/741,329, filed Jan. 14, 2013, mailed May 7, 2014, 15 pgs.
Smick, Stephen J.; Notice of Allowance for U.S. Appl. No. 13/741,329, filed Jan. 14, 2013, mailed Sep. 17, 2014, 11 pgs.
Smick, Stephen J.; U.S. Patent Application entitled: Valve With Sync Cam having U.S. Appl. No. 13/741,329, filed Jan. 14, 2013, 51 pgs.
Duff-Norton; Technical Data Sheet—Machine Screw Actuator, 5-Ton Capacity; publicly available prior to Dec. 8, 2012; p. 25.
Smick, Stephen J.; U.S. Patent Application entitled: Sleeve Valve with Sync Cam, having U.S. Appl. No. 14/577,731, filed Dec. 19, 2014, 42 pgs.
Smick, Stephen J.; Restriction Requirement for U.S. Appl. No. 14/577,731, filed Dec. 19, 2014, mailed Feb. 22, 2016, 5 pgs.
Smick, Stephen J.; Issue Notification for U.S. Appl. No. 13/741,326, filed Jan. 14, 2013, mailed Feb. 4, 2015, 1 pg.
Smick, Stephen J.; Supplemental Notice of Allowability for U.S. Appl. No. 13/741,326, filed Jan. 14, 2013, mailed Dec. 31, 2014, 4 pgs.
Smick, Stephen J.; Issue Notification for U.S. Appl. No. 13/741,329, filed Jan. 14, 2013, mailed Jan. 14, 2015, 1 pg.
Smick, Stephen J.; Supplemental Notice of Allowability for U.S. Appl. No. 13/741,329, filed Jan. 14, 2013, mailed Jan. 2, 2015, 4 pgs.
Smick, Stephen J.; Non-Final Office Action for U.S. Appl. No. 14/577,731, filed Dec. 19, 2014, mailed Apr. 20, 2016, 16 pgs.
Smick, Stephen J.; Non-Final Office Action for U.S. Appl. No. 14/577,731, filed Dec. 19, 2014, mailed May 9, 2016, 17 pgs.
Smick, Stephen J.; U.S. Divisional Application entitled: Sleeve Valve With Sync Cam having U.S. Appl. No. 15/067,373, filed Mar. 11, 2016, 43 pgs.
Smick, Stephen J.; U.S. Divisional Application entitled: Valve With Sync Cam having U.S. Appl. No. 15/067,385, filed Mar. 11, 2016, 49 pgs.
Smick, Stephen J.; Notice of Allowance for U.S. Appl. No. 14/577,731, filed Dec. 19, 2014, mailed Aug. 2, 2016, 9 pgs.
Smick, Stephen J.; Non-Final Office Action for U.S. Appl. No. 15/067,385, filed Mar. 11, 2016, mailed Aug. 8, 2016, 18 pgs.
Smick, Stephen J.; Non-Final Office Action for U.S. Appl. No. 15/067,373, filed Mar. 11, 2016, mailed Aug. 10, 2016, 16 pgs.

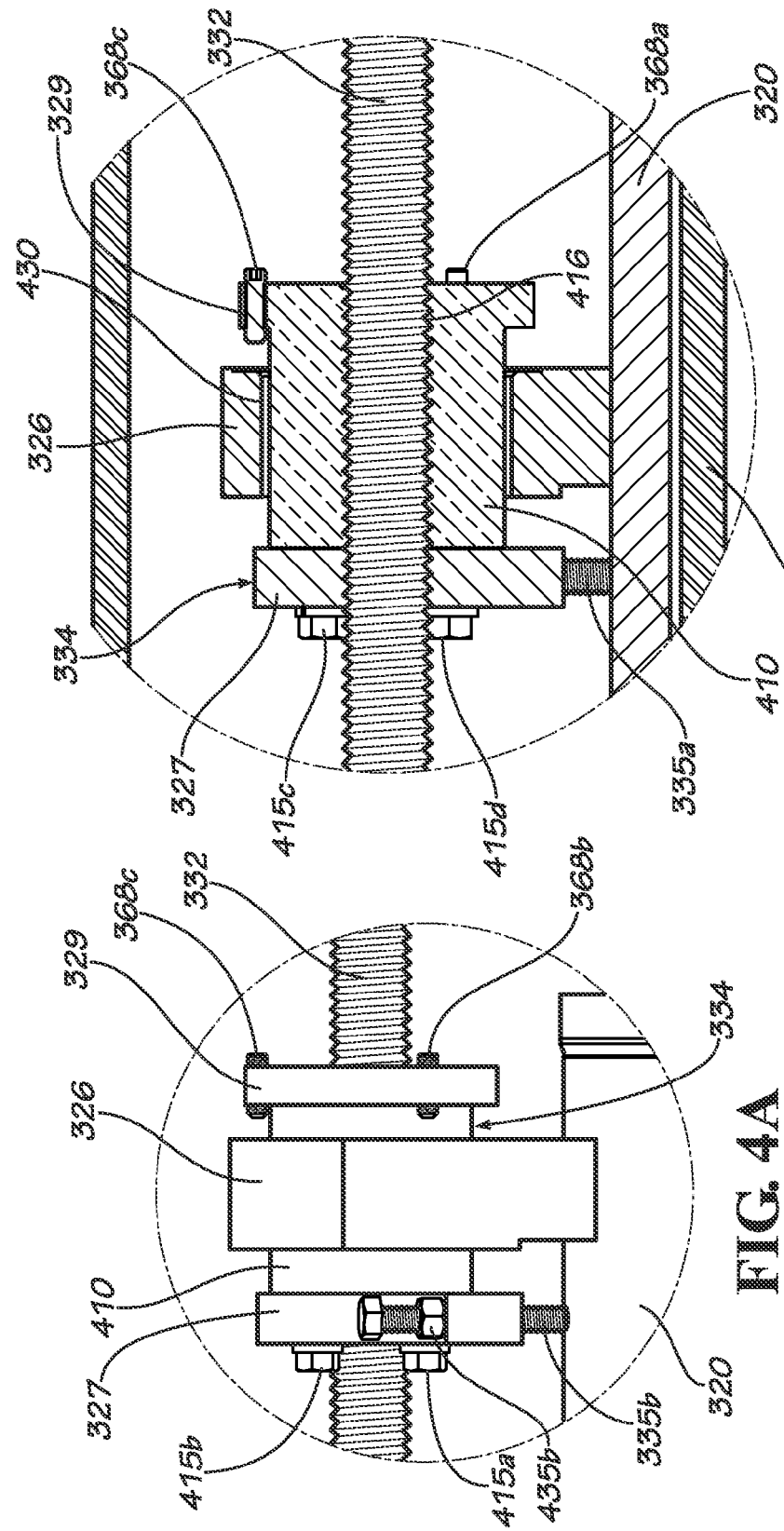

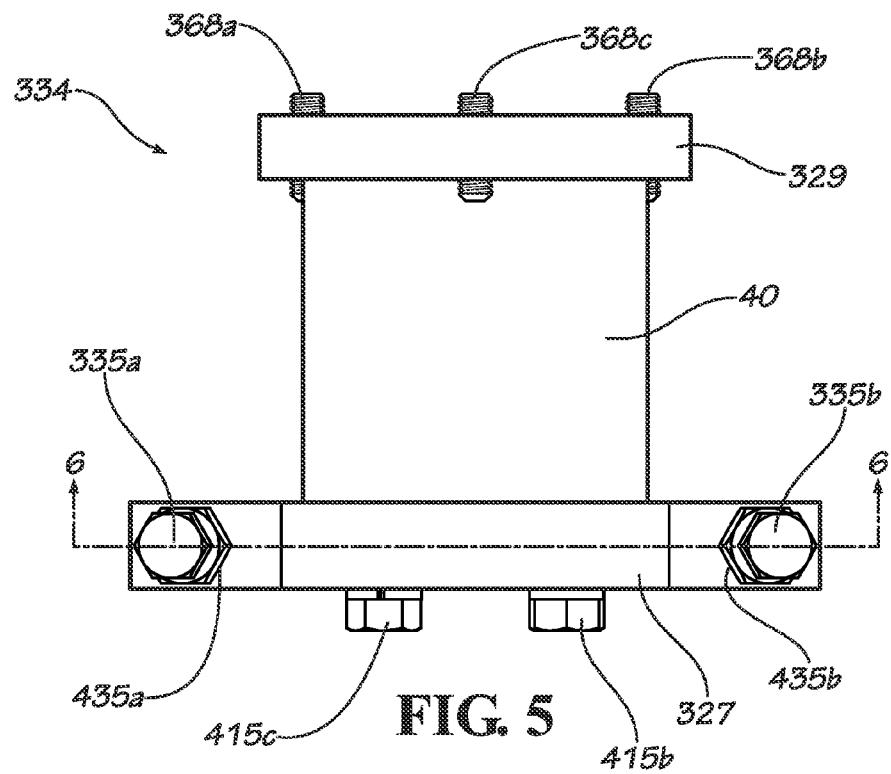
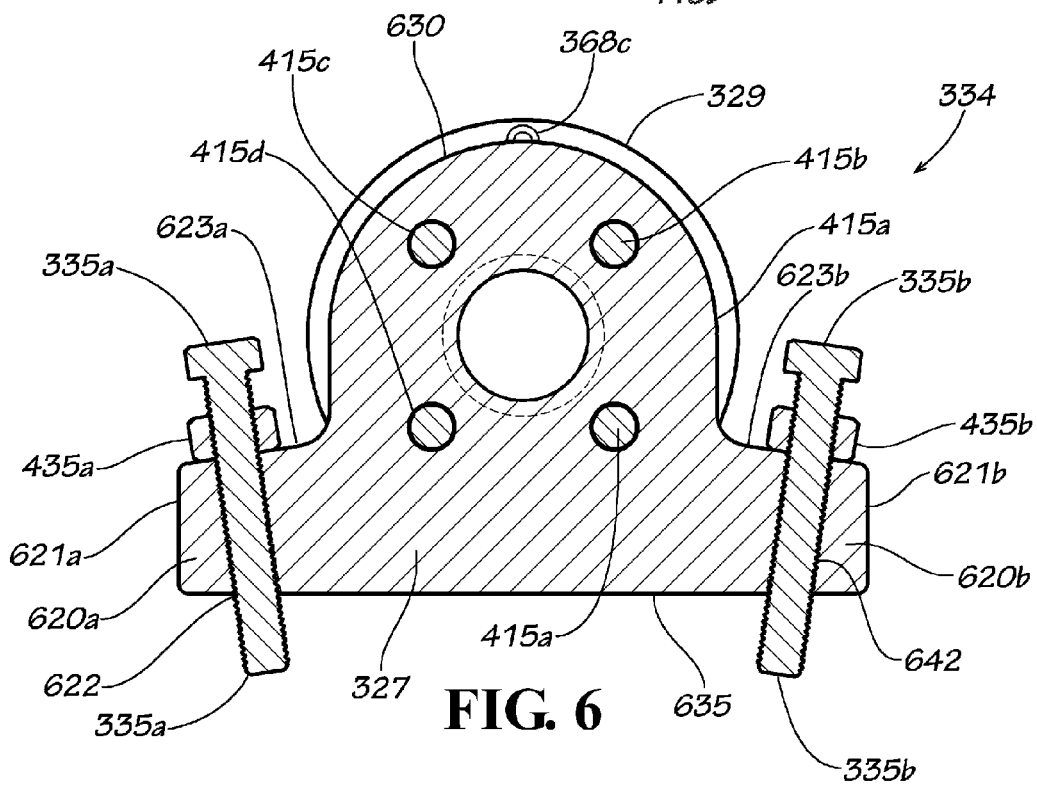

VALVE WITH SYNC CAM

REFERENCE TO RELATED APPLICATIONS

This application is a continuation of U.S. application Ser. No. 13/741,329, filed Jan. 14, 2013, which is hereby specifically incorporated by reference herein in its entirety.

TECHNICAL FIELD

This disclosure relates to valves. More specifically, this disclosure relates to sync cams used in valves.

BACKGROUND

Valve elements are used to regulate or control the flow of material by opening, closing, or partially obstructing various passageways. One type of valve is a sleeve valve, which can be used in a number of applications. Some sleeve valves contain one or more perforated openings on a sleeve that allow for material to flow through the valve. Another type of valve is a fixed cone valve. Some fixed cone valves include a cone that may contact a gate to restrict material from flowing through the valve.

SUMMARY

Disclosed is a valve including a valve body having an inner surface and an outer surface, the inner surface and the outer surface defining an inlet, an outlet, and a body cavity between the inlet and the outlet; a gate movably coupled to the valve body and moveable over a portion of the valve body at least partially between the inlet and the outlet, the gate including a cam stop; and a drive assembly, the drive assembly including a pair of drive lines, each drive line having a drive shaft, a first drive line of the pair of drive lines including a sync cam, the sync cam of the first drive line movably positioned on the drive shaft of the first drive line and positioned relative to the cam stop.

Also disclosed is a method of controlling the flow of fluid in a pipe system including controlling a valve in the pipe system, the valve including a valve body having an inner surface and an outer surface, the inner surface and the outer surface defining an inlet, an outlet, and a body cavity between the inlet and the outlet; a gate movably coupled to the valve body and moveable over a portion of the valve body at least partially between the inlet and the outlet, the gate including a cam stop; and a drive assembly, the drive assembly including a pair of drive lines, each drive line having a drive shaft, a first drive line of the pair of drive lines including a sync cam, the sync cam of the first drive line movably positioned on the drive shaft of the first drive line and positioned relative to the cam stop, a first gap defined between a front flange of the sync cam and the cam stop, a second gap defined between a back flange of the sync cam and the cam stop; moving the sync cam in a first direction to a front stop position, wherein the front stop position reduces the first gap; and moving the gate in the first direction to allow fluid to flow from the inlet to the outlet.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 4A is a detail view of a sync cam, a drive shaft, and a gate of the sleeve valve of FIG. 3.

FIG. 4B is a cross-sectional view of the sync cam, drive shaft, and gate of the sleeve valve of FIG. 3.

FIG. 5 is a top view of the sync cam of the sleeve valve of FIG. 1.

FIG. 6 is a cross-sectional view of the sync cam of FIG. 5 taken along line 6-6.

DETAILED DESCRIPTION

Disclosed is a valve and associated methods, systems, devices, and various apparatus. The valve includes a drive assembly having at least one drive line including a sync cam and a drive shaft. It would be understood by one of skill in the art that the disclosed valve is described in but a few exemplary embodiments among many. No particular terminology or description should be considered limiting on the disclosure or the scope of any claims issuing therefrom.

Figure 1:
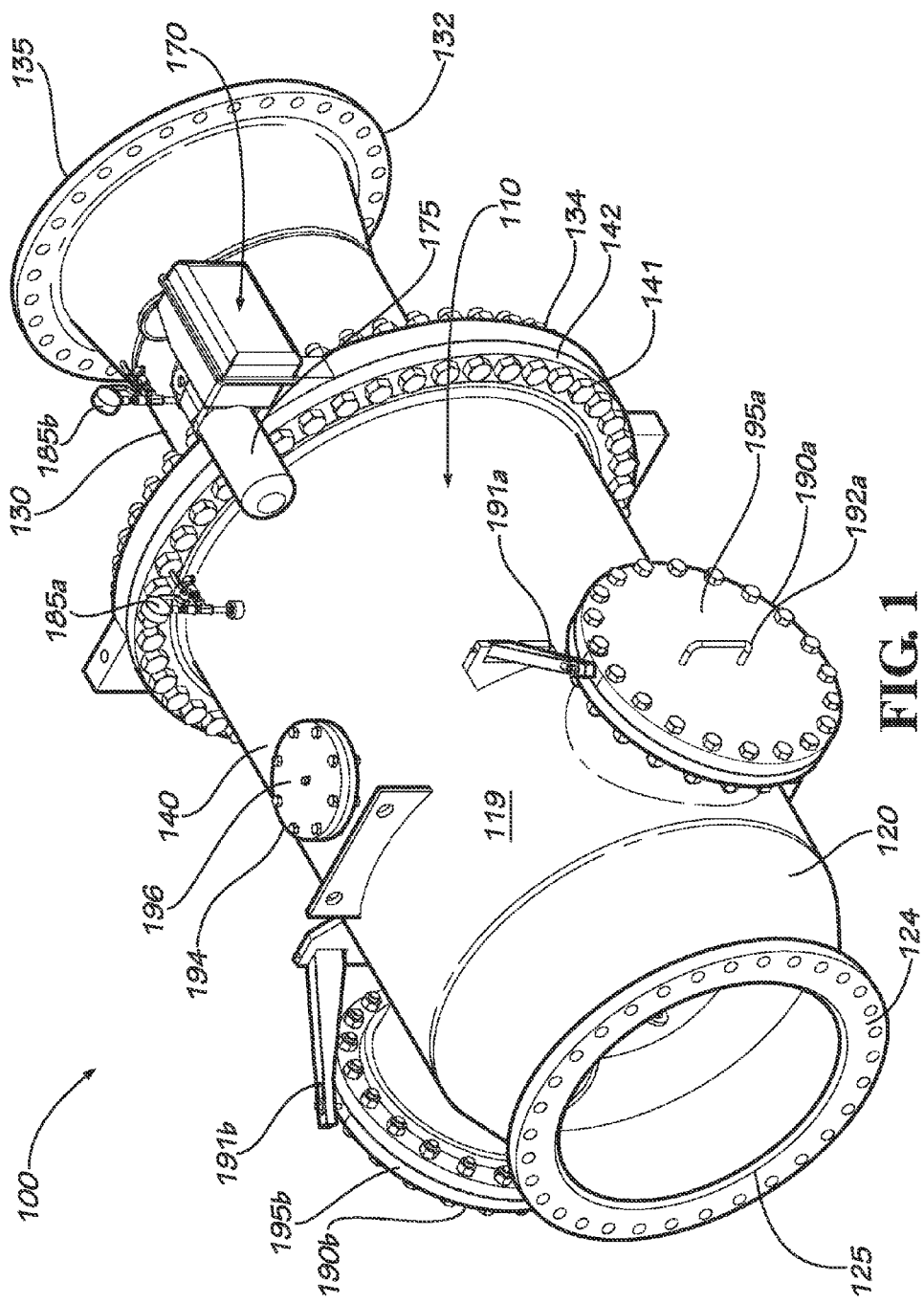
FIG. 1 is a perspective view of a sleeve valve in accord with one embodiment of the current disclosure.
Figure 2:
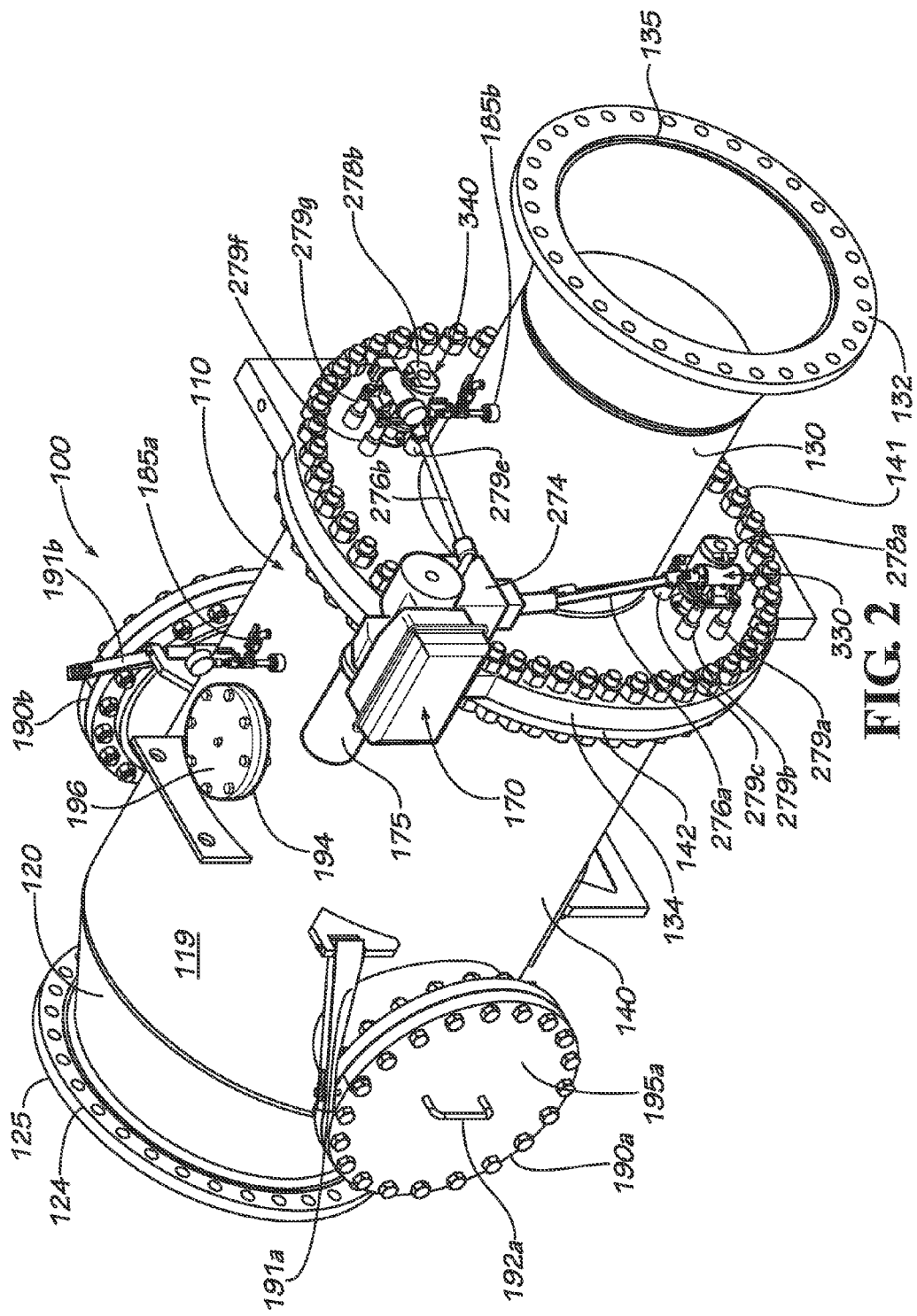
FIG. 2 is a perspective view from another end of the sleeve valve of FIG. 1.

One embodiment of a valve of the present invention is a sleeve valve 100, which is disclosed and described in FIGS. 1-2. In FIG. 1 the sleeve valve 100 includes a valve body 110 that has an inner surface 117 (shown in FIG. 3) and an outer surface 119. The inner surface 117 and the outer surface 119, as illustrated in the current embodiment, define an inlet portion 120, an outlet portion 130, and a body cavity portion 140. In the current embodiment, the inlet portion 120 defines an inlet 125 and is conical-shaped and welded to the body cavity portion 140, although other joining interfaces are contemplated by this disclosure and should be considered included. The outlet portion 130 defines an outlet 135. The outlet portion 130 and the body cavity portion 140, in the current embodiment, are both of an approximately cylindrical shape. The shape of the inlet portion 120, the outlet portion 130, and the body cavity portion 140 are not limiting and may be other shapes. The inlet portion 120, the outlet portion 130, and the body cavity portion 140 in the current embodiment are made of welded fabricated carbon steel plates, although one of skill in the art would recognize that other materials could be used and such a disclosure is not limiting. The inlet portion 120, the outlet portion 130, and the body cavity portion 140 may also include flanged ends, and as seen in the current embodiment in FIG. 1, the inlet portion 120 includes one flanged end 124 on the opposite end of that which is connected to the body cavity portion 140. Also, in the current embodiment, both ends of the outlet portion 130 include flanged ends 132 and 134, and the end of the body cavity portion 140 that faces the outlet portion 130 includes a flanged end 142.

The current embodiment includes fastening elements 141 in the form of a plurality of nuts and bolts coupling the flanged end 142 of the body cavity portion 140 to the flanged end 134 of the outlet portion 130 and thereby joining the body cavity portion 140 to the outlet portion 130. However, various types of fasteners, such as nails, screws, welding, or any other type of fastener may be used, and the disclosure of nuts and bolts is not limiting upon the fastener that must be used. Additionally, as illustrated in FIG. 1, the sleeve valve 100 includes a drive assembly 170 including an actuator motor 175 and drive lines (330 and 340 in FIG. 3). Further, the current embodiment of the sleeve valve 100 includes inspection ports 190a and 190b that are circular and defined in the body cavity portion 140 and include inspection lids 195a,b fastened to the outer surface 119 of the valve body 110 via a plurality of nuts and bolts. However, various types of fasteners, such as nails, screws, or any other type of fastener may be used, and the disclosure of nuts and bolts is not limiting upon the fastener that must be used. The shape of the inspection ports 190a and 190b is not limiting, and other shapes such as oval and square may be used. The inspection ports 190a and 190b allow access to the interior of the body cavity portion 140. In the current embodiment, inspection ports 190a,b include hinges 191a,b and handles 192a,b (192b not shown).

The current embodiment of the sleeve valve 100 also includes an access port 194 that is circular and defined on the outer surface 119 of the valve body 110. The access port 194 includes an access lid 196 fastened to the outer surface 119 of the valve body 110 via a plurality of nuts and bolts. However, various types of fasteners, such as nails, screws, or any other type of fastener may be used, and the disclosure of nuts and bolts is not limiting upon the fastener that must be used. Moreover, the shape of the access port 194 is not limiting and other shapes such as oval and square may be used. In the current embodiment, the body cavity portion 140 and the outlet portion 130 include pressure gauges 185a and 185b that are located on the outer surface 119, but these are not required for all embodiments.

FIG. 2 displays a perspective view of the sleeve valve 100 where the outlet portion 130 is in the foreground of the illustration. As can be seen in the current embodiment, the actuator motor 175 is mounted to the outer surface 119 of the flanged end 134 of the outlet portion 130, although the actuator motor 175 may be mounted to any portion of the sleeve valve 100. The actuator motor 175 is connected to the drive lines (330 and 340 in FIG. 3) by a splitter 274, or three-way gear, and two actuator drive shafts 276a and 276b extending from the splitter 274 to two separate machine screw actuators 278a and 278b, where actuator drive shaft 276a is attached to machine screw actuator 278a and actuator drive shaft 276b is attached to machine screw actuator 278b. Splitter 274 translates rotational movement from the actuator motor 175 to the actuator drive shafts 276a,b, which translate rotational movement to each machine screw actuator 278a,b, respectively. Machine screw actuator 278a is part of drive line 330 and machine screw actuator 278b is part of drive line 340. In the current embodiment, the machine screw actuators 278a and 278b are Duff-Norton Machine Screw Actuators, model number DM-9006; however, one of skill in the art would recognize that such a disclosure is not limiting and other types of machines or operations that enable the drive shaft 332 and/or 342 (described with reference to FIG. 3) to operate may be used. The drive assembly 170 can be operated in many different ways, including automatically from a remote location, via local controls on the actuator motor 175 itself, or via a clutch lever, and the methods of operation of the drive assembly 170 are not intended to be limiting. The actuator motor 175 is an electric motor, but may also be a manual handwheel in alternative embodiments. Additionally, in the current embodiment, actuator spacers 279a,b,c,d (279d not shown) mount machine screw actuator 278a to the outlet portion 130 and actuator spacers 279e,f,g,h (279h not shown) mount machine screw actuator 278b to the outlet portion 130, but the machine screw actuators 278a,b may be mounted to the outlet portion 130 by any other types or amount of fasteners.

Figure 3:
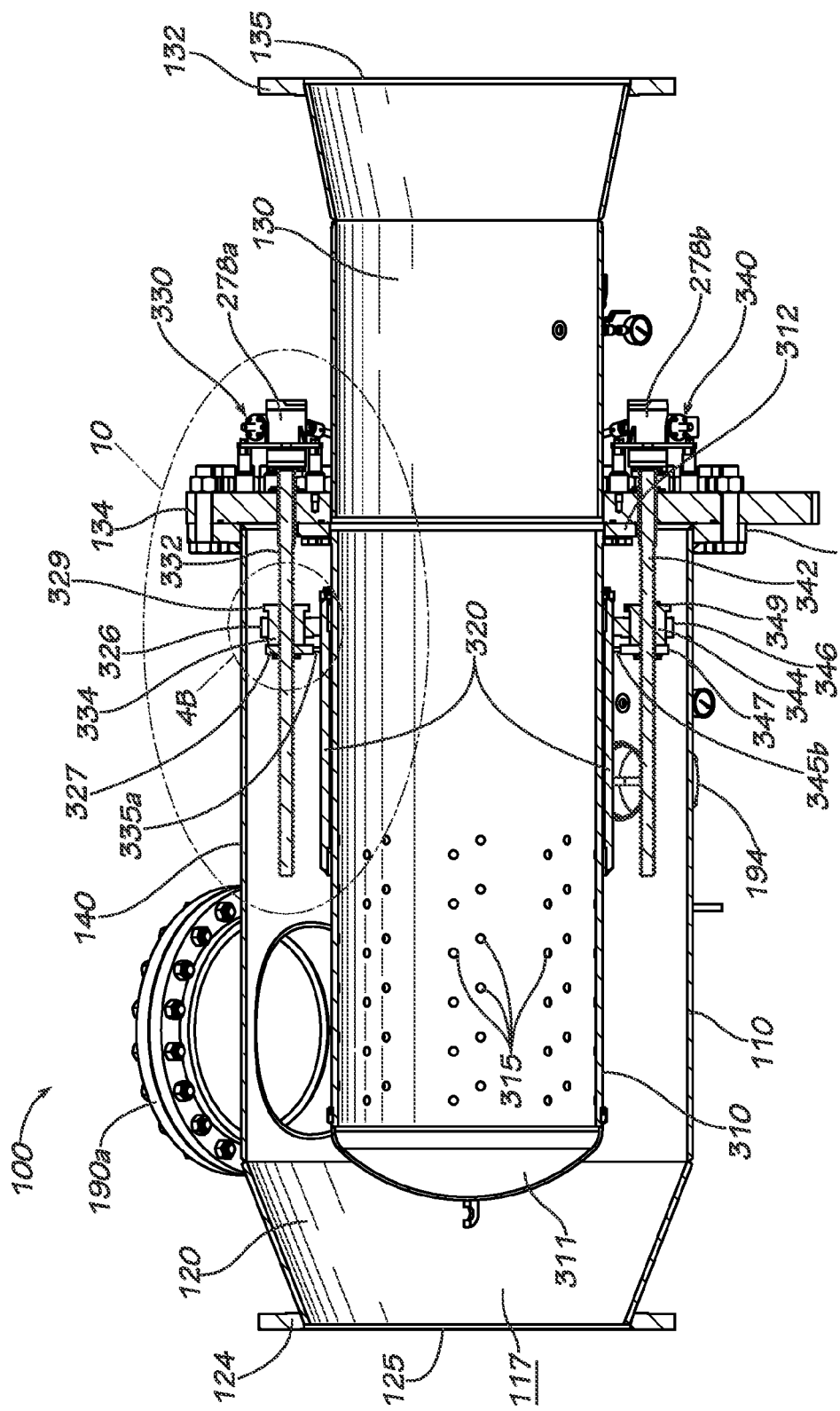
FIG. 3 is a cross-sectional view of the sleeve valve of FIG. 1.

FIG. 3 provides a cross-sectional view of the sleeve valve 100. In the current embodiment, material flows from the inlet portion 120 through a body cavity defined within the body cavity portion 140 to the outlet portion 130. Inspection port 190a and access port 194 are also shown in the current embodiment. In the current embodiment, the valve body 110 includes a sleeve 310 located within the body cavity portion 140 and secured at a sleeve flanged end 312 to the outlet portion 130 by a plurality of nuts and bolts. The sleeve 310, in the current embodiment, is cylindrically shaped with a dome-shaped sleeve end 311 that prevents material from entering the sleeve 310 from sleeve end 311. The sleeve flanged end 312 is open to allow material to flow freely from the sleeve 310 to the outlet portion 130 once the material enters the interior of the sleeve 310. The shapes of sleeve end 311 and sleeve flanged end 312 are not limiting and other shapes may be used. Additionally, the technique of securing sleeve flanged end 312 of sleeve 310 to the outlet portion 130 may be achieved using any known technique in the art. The sleeve 310 in the current embodiment is made of a welded fabricated stainless steel plate, although one of skill in the art would recognize that other materials could be used and such a disclosure is not limiting.

In the current embodiment, sleeve 310 includes perforated openings 315, which allow material to flow from the body cavity portion 140 to the interior of the sleeve 310. Although multiple perforated openings 315 are shown in the current embodiment, only one perforated opening may be included, and any number of perforated openings 315 may be included in various embodiments. In the current embodiment, perforated openings 315 refer to all openings in the sleeve 310. The elements to which reference 315 points are exemplary only and should not be considered limiting on the disclosure. Proximate to the sleeve 310, in the current embodiment, is a gate 320, which is moveable over a portion of the sleeve 310 including at least one of the perforated openings 315. When the gate 320, in the current embodiment, is positioned over at least one of the perforated openings 315, the gate 320 prevents material from flowing into or out of the interior of the sleeve 310 through the at least one perforated opening 315 that the gate 320 is positioned over. However, neither the material nor shape of the gate 320 is limiting, and various materials or shapes may be used in various embodiments. The gate 320 in the current embodiment is made of a welded fabricated stainless steel plate, although one of skill in the art would recognize that other materials could be used and such a disclosure is not limiting. As can be seen in FIG. 3, the current embodiment includes drive line 330, which operates to move the gate 320 axially over the sleeve 310. In the current embodiment, the drive line 330 includes a drive shaft 332, which is a cylindrical rod that rotates and includes at least a threaded portion. The drive shaft 332 connects to the machine screw actuator 278*a* in the current embodiment.

The drive shaft 332 in the current embodiment is made of stainless steel, although one of skill in the art would recognize that other materials could be used and such a disclosure is not limiting. The gate 320 will be enabled to move axially along the sleeve 310 within the portion of the drive shaft 332 that is threaded. Moreover, in the current embodiment, the drive line 330 includes a sync cam 334, which is moveably positioned around the drive shaft 332. Additionally, when the drive shaft 332 rotates the sync cam 334 may move axially relative to a cam stop 326 in the form of a stop plate, though other cam stops may be used in other embodiments.

In addition, the sync cam 334 in the current embodiment includes a front flange 327 and a back flange 329. The front flange 327 includes two forward direction load balancing screws 335*a* and 335*b* (335*b* shown in FIG. 4A). Although the current embodiment includes two forward direction load balancing screws 335*a* and 335*b*, other embodiments may include any number of forward direction load balancing mechanisms, which can be nuts and bolts, screws, other types of fasteners, or any other load balancing mechanism. Additionally, the drive line 330 may include more than one sync cam 334 and drive shaft 332. In the current embodiment, the cam stop 326 is connected to and formed on the gate 320, but it is not a requirement that the cam stop 326 be connected to or formed on the gate 320.

The cam stop 326 can be a plate or any other mechanism that limits movement of the sync cam 334 along the drive shaft 332 relative to the gate 320. Additionally, in the current embodiment, the back flange 329 includes three backward direction load balancing screws 368*a,b,c* (shown in FIGS. 4A, 4B, 5, and 7); however, this configuration is not meant to be limiting in terms of the type of mechanism used for backward direction load balancing and the number of backward direction load balancing mechanisms. The back flange 329 includes at least one backward direction load balancing mechanism, which can be achieved with nuts and bolts, screws, other types of fasteners, or any other load balancing mechanism which is known in the art.

The components of the drive line 330, in the current embodiment, are not meant to be limiting. Additional components may be added to the drive line 330 and the components in combination described above are not all required. In the current embodiment, an additional drive line 340 is provided, although it is not required, and is located approximately 180 degrees from drive line 330, though the drive line 340 may be located relative to the drive line 330 in any position in other embodiments. Drive line 340, in the current embodiment, is configured in the same way drive line 330 is configured. The drive line 340 includes a drive shaft 342, which is configured in the same way as drive shaft 332. The drive shaft 342 connects to the machine screw actuator 278*b* in the current embodiment. The drive line 340 also includes a sync cam 344, which is configured in the same way as sync cam 334, and the drive line 340 may include more than one sync cam 344 and drive shaft 342. Also, the sync cam 344 in the current embodiment includes a front flange 347 and a back flange 349. The front flange 347 includes two forward direction load balancing screws 345*a,b* (345*a* shown in FIG. 8). Although the current embodiment includes two forward direction load balancing screws 345*a,b*, that is not meant to be limiting. The sync cam 344 includes at least one forward direction load balancing mechanism, which can be achieved with nuts and bolts, screws, other types of fasteners, or any other load balancing mechanism.

In the current embodiment, a cam stop 346 is connected to and formed on the gate 320, but it is not a requirement in all embodiments that the cam stop 346 be connected to or formed on the gate 320. The cam stop 346 can be a plate or any other mechanism that limits movement of the sync cam 344 along the drive shaft 342 relative to the gate 320. Additionally, in the current embodiment, the back flange 349 includes three backward direction load balancing screws 378*a,b,c* (378*a,c* shown in FIG. 8A, 378*b* not shown); however, this configuration is not meant to be limiting in terms of the type of mechanism used for backward direction load balancing and the number of backward direction load balancing mechanisms. The back flange 349 includes at least one backward direction load balancing mechanism, which can be achieved with nuts and bolts, screws, other types of fasteners, or any other load balancing mechanism which is known in the art. Although in the current embodiment the drive line 340 is configured in the same way and includes all of the same components as drive line 330, the embodiment is not meant to be limiting. Drive line 340 may also include additional components, and the components in combination described above are not all required. Moreover, additional drive lines may be implemented with the sleeve valve 100.

FIG. 4A is a side detail view of the sync cam 334, the drive shaft 332, and the gate 320 of the sleeve valve 100. The drive line 340 is configured substantially the same as drive line 330 in the current embodiment. The sync cam 334, in the current embodiment, includes the front flange 327, the back flange 329, and a cylindrical middle portion 410 extending between the front flange 327 and the back flange 329 and through the cam stop 326, although the components of the sync cam 334 are not critical. In the current embodiment, the sync cam 334 includes two forward direction load balancing screws 335a and 335b. Each forward direction load balancing screw 335a,b extends through the front flange 327 and through front nuts 435a,b (435b shown in FIG. 5), respectively, to contact gate 320. The front flange 327 is coupled to the middle portion 410 by flange screws 415a,b,c,d (415c,d shown in FIG. 4B). In alternative embodiments, the front flange 327 may be coupled to the middle portion 410 by other fastening methods, including gluing or welding, or the front flange 327 may be formed on the middle portion 410 so that the sync cam 334 is a single unit. The back flange 329 is formed on the middle portion 410 so that the middle portion 410 and back flange 329 are a single unit, though the back flange 329 may be separate from the middle portion 410 in other embodiments. The back flange 329 may be coupled to the middle portion 410 by screws, welding, or gluing in other embodiments. Backward direction load-balancing screws 368a,b,c extend through back flange 329.

FIG. 4B is a side cross-sectional detail view of the sync cam 334, the drive shaft 332, the gate 320, and the sleeve 310 of the sleeve valve 100. In the current embodiment, the gate 320 is located proximate to the sleeve 310, and as seen in FIG. 14, there is nearly no space between gate 320 and sleeve 310, although there may be space in various embodiments. Sync cam 334, in the current embodiment, also defines a circular drive shaft bore 416 through the center of the sync cam 334, including through front flange 327, middle portion 410, and back flange 329, although the position and shape of the bore is not critical. The drive shaft bore 416 is threaded in the current embodiment such that the threads of drive shaft bore 416 engage threads of drive shaft 332 to allow movement of the sync cam 334 along the drive shaft 332, though the drive shaft 332 may engage the sync cam 334 in any manner in other embodiments to allow movement of the sync cam 334 along the drive shaft 332. Because the sync cam 334 engages the drive shaft 332, the sync cam 334 is thereby moveably positioned relative to the drive shaft 332. Cam stop 326 defines a cam bore 430 having a diameter greater than the diameter of middle portion 410 and through which middle portion 410 extends. However, the diameter of cam bore 430 does not permit front flange 327 and back flange 329 from traveling through cam bore 430, thereby limiting the relative movement of the sync cam 334 relative to cam stop 326. Middle portion 410, and therefore the distance between front flange 327 and back flange 329, is longer than the thickness of cam stop 326.

FIG. 5 is a top view of sync cam 334 and shows all three backward direction load balancing screws 368a,b,c extending through the back flange 329. The backward direction load balancing screws 368a,b,c are threaded and engage threaded holes defined in the back flange 329.

FIG. 6 shows a cross-sectional view of the sync cam 334 taken along lines 6-6 in FIG. 5. In the current embodiment, the sync cam 334 includes two lobes 620a and 620b, which are located on each side of a rounded middle section 630. In the current embodiment, sync cam 344 includes lobes 640a,b which are similar to lobes 620a,b of sync cam 334. Also, each lobe 620a and 620b extends from the sync cam 334 a distance longer than a distance between the drive shaft 332 and a gate surface 721 (shown in FIG. 8A) of the gate 320. In the current embodiment, the lobes 620a and 620b include side edges 621a,b and top edges 623a,b. A bottom edge 635 extends along the bottom of the sync cam 334, including along lobes 620a,b. Sync cam 334, in the current embodiment, also includes two threaded forward direction load balancing screws 335a and 335b extending through front nuts 435a,b and two threaded forward load balancing holes 622 and 642. Forward load balancing hole 622 is defined in lobe 620a and forward load balancing hole 642 is defined in lobe 620b; however, this configuration is not meant to be limiting in terms of the type of mechanism used for forward direction load balancing and the number of forward direction load balancing mechanisms. Depending on whether or not the type of forward direction load balancing mechanism requires a hole or holes, forward direction load balancing holes 622 and 642 might or might not be necessary; in some embodiments, more forward direction load balancing holes may be required.

Figure 7:
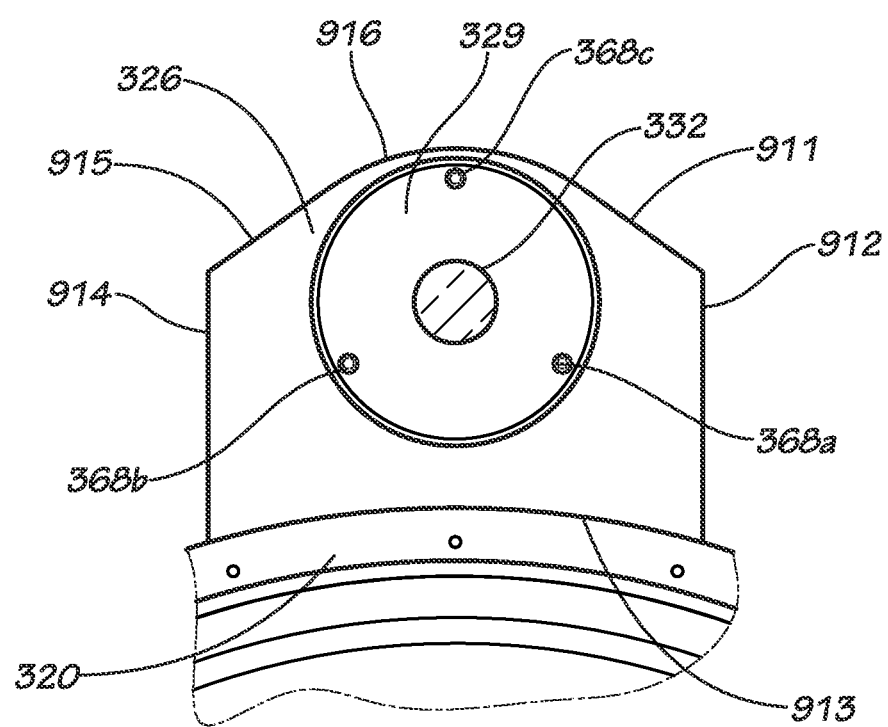
FIG. 7 is a detail view of the sync cam, drive shaft, and gate of the sleeve valve of FIG. 1.

FIG. 7 is a detail view of sync cam 334 extending through the cam stop 326 of the gate 320. In the current embodiment, the cam stop 326 is six-sided and made of solid material. Cam stop 326 includes flat edges at top right side 911, right side 912, left side 914, and top left side 915. Additionally, the cam stop 326 includes a rounded top side 916 and a rounded bottom side 913 that approximates the curvature of the gate surface 721. Although, in the current embodiment, the cam stop 326 includes six sides that result in the shape seen in FIG. 7, such a disclosure is not meant to be limiting. Other shapes such as a square, rectangle, triangle, and polygon, among others, may be used for the cam stop 326. Moreover, the cam stop 326 need not be of the same shape. Also, in the current embodiment, the cam stop 326 includes cam bore 430 as described in the description of FIG. 4. FIG. 7 also shows the positions of the three backward direction load balancing screws 368a,b,c on the back flange 329

Figure 8A:
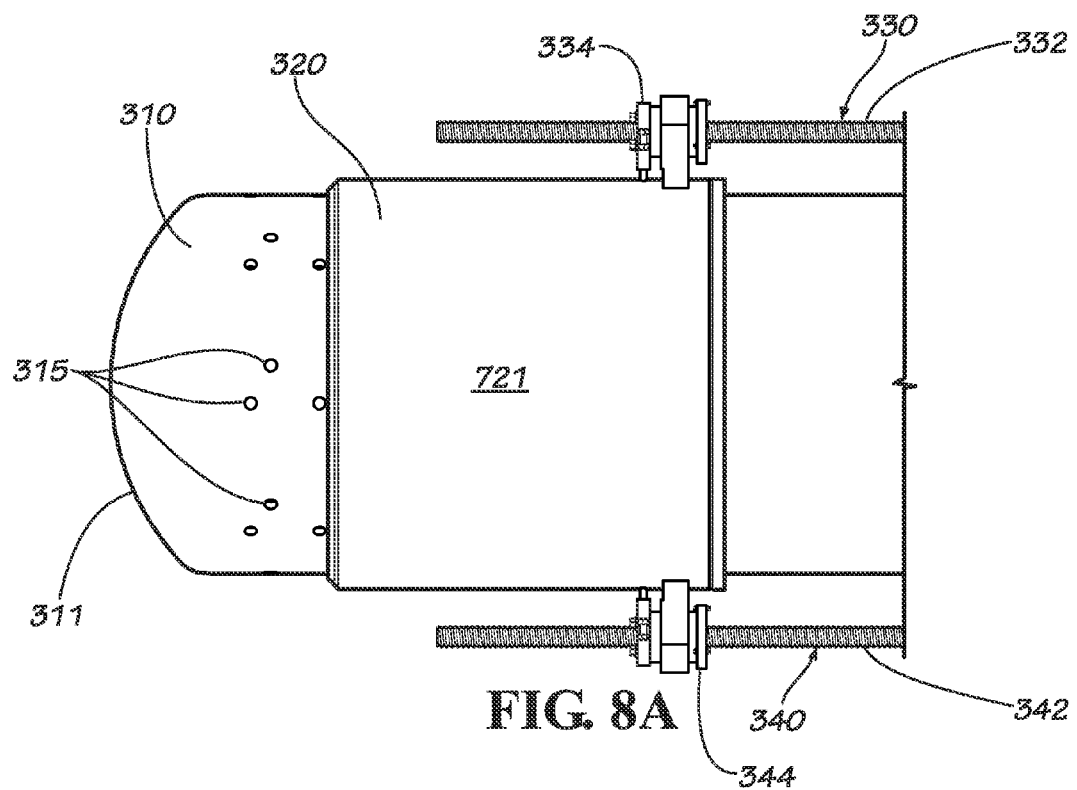
FIG. 8A is a side view of a pair of drive lines of a drive assembly and the gate surrounding a sleeve of the sleeve valve of FIG. 1, wherein the view of a drive shaft of each drive lines is abridged, showing only a portion of the drive shaft.

FIG. 8A is a side view of the sleeve 310, gate 320, and drive lines 330 and 340. Although in the current embodiment the drive line 340 is configured in the same way and includes all of the same components as drive line 330, the embodiment is not meant to be limiting. Drive line 340 may also include or different additional components, and the components in combination described above are not all required. Gate 320 includes gate surface 721, which in the current embodiment is made of a welded fabricated stainless steel plate. As shown and described with reference to FIG. 3, when the gate 320 is positioned over at least one of the perforated openings 315, the material used for gate 320 prevents fluid material from flowing into or out of the interior of the sleeve 310 through the at least one perforated opening 315 over which the gate 320 is positioned. The shape of gate 320 enables the gate 320 to be moveable over a portion of the sleeve 310, as seen in FIG. 3, including at least one of the perforated openings 315 (also seen in FIG. 3).

Figure 8B:
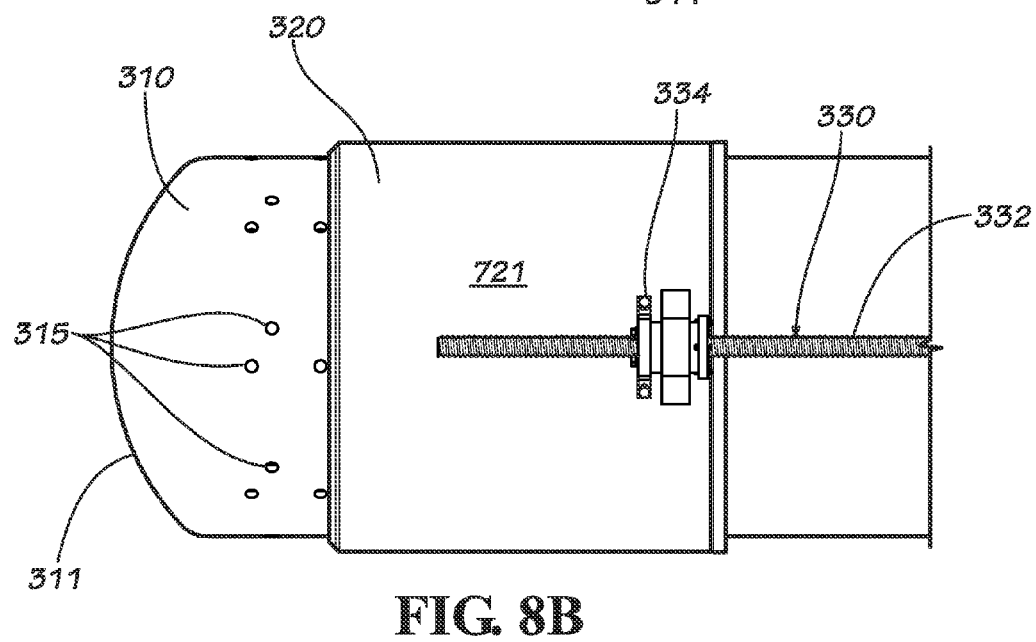
FIG. 8B is a top view of the gate and one of the the drive lines of FIG. 8.

FIG. 8B is a top view of the sleeve 310, the gate 320, and the drive line 330 from FIG. 8A. The configuration of the drive line 340 is substantially the same as the configuration of drive line 330 as shown in the current embodiment.

Figure 9A:
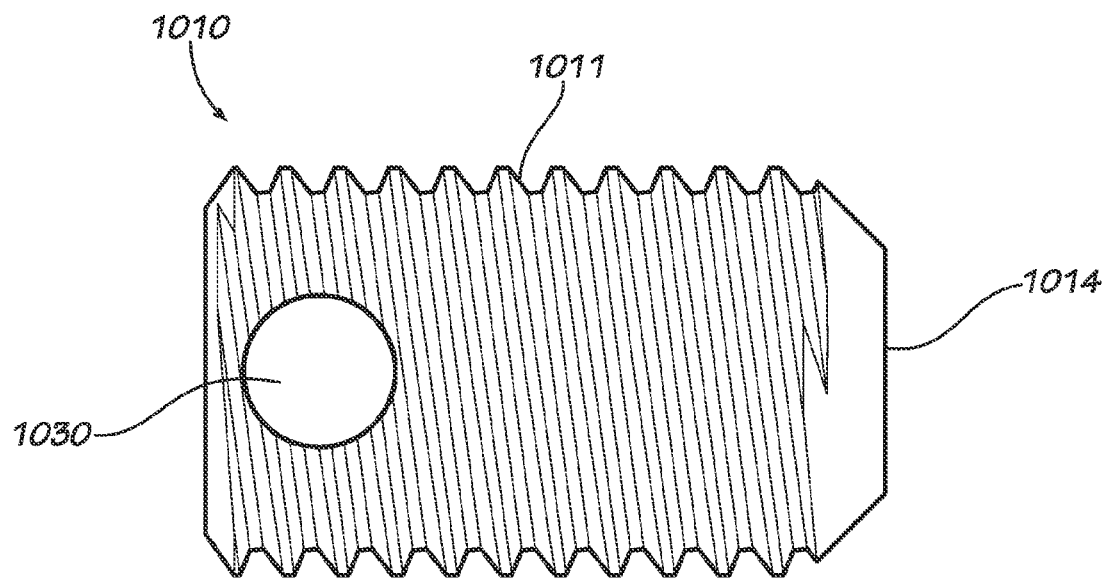
FIG. 9A is a side view of a front direction load balancing screw of the sync cam of FIG. 5. In the current embodiment the front direction load balancing screw is identical to a backward direction load balancing screw.
Figure 9B:
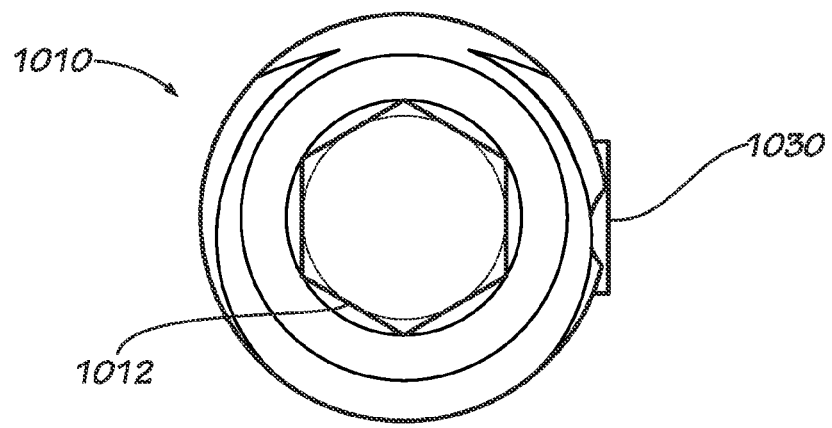
FIG. 9B is a top view of the front direction load balancing screw of FIG. 9A. In the current embodiment the front direction load balancing screw is identical to the backward direction load balancing screw.

FIGS. 9A-9B show load balancing screw 1010. The load balancing screw 1010 can be the backward direction load balancing screws 368a,b,c or 378a,b,c. In the current embodiment, the load balancing screw 1010 include a top end 1012 that connects to the head portion of the load balancing screws 1010, a threaded main portion 1011, and a bottom end 1014, which is a flat, non-threaded portion. However, the bottom end 1014, in the current embodiment, may be threaded or may be configured to end as a sharp point, and the current disclosure is not meant to be limiting. The load balancing screw 1010, in the current embodiment, also includes a self-locking mechanism 1030. The self-locking mechanism 1030 includes a piece of plastic material that is packed inside a bore through the side of the load balancing screw 1010. The self-locking mechanism 1030 in the current embodiment is not meant to be limiting, and other forms of self-locking may be used or a load balancing screw 1010 without a self-locking mechanism 1030 may be used as well.

As can be seen in the current embodiment, the top 1012 of load balancing screw 1010 is configured with a hexagonal head. However, the current embodiment is not meant to be limiting and the top 1012 can be configured to include other types of heads, such as a slot head, a cross-head, a torx head, or any other types of head. The top 1012 in the current embodiment is dome shaped, however, other shapes may be used for the top 1012, such as a low disc with a chamfered outer edge, cylindrical with a rounded top, truss shaped, flat, or any other shape.

Figure 10:
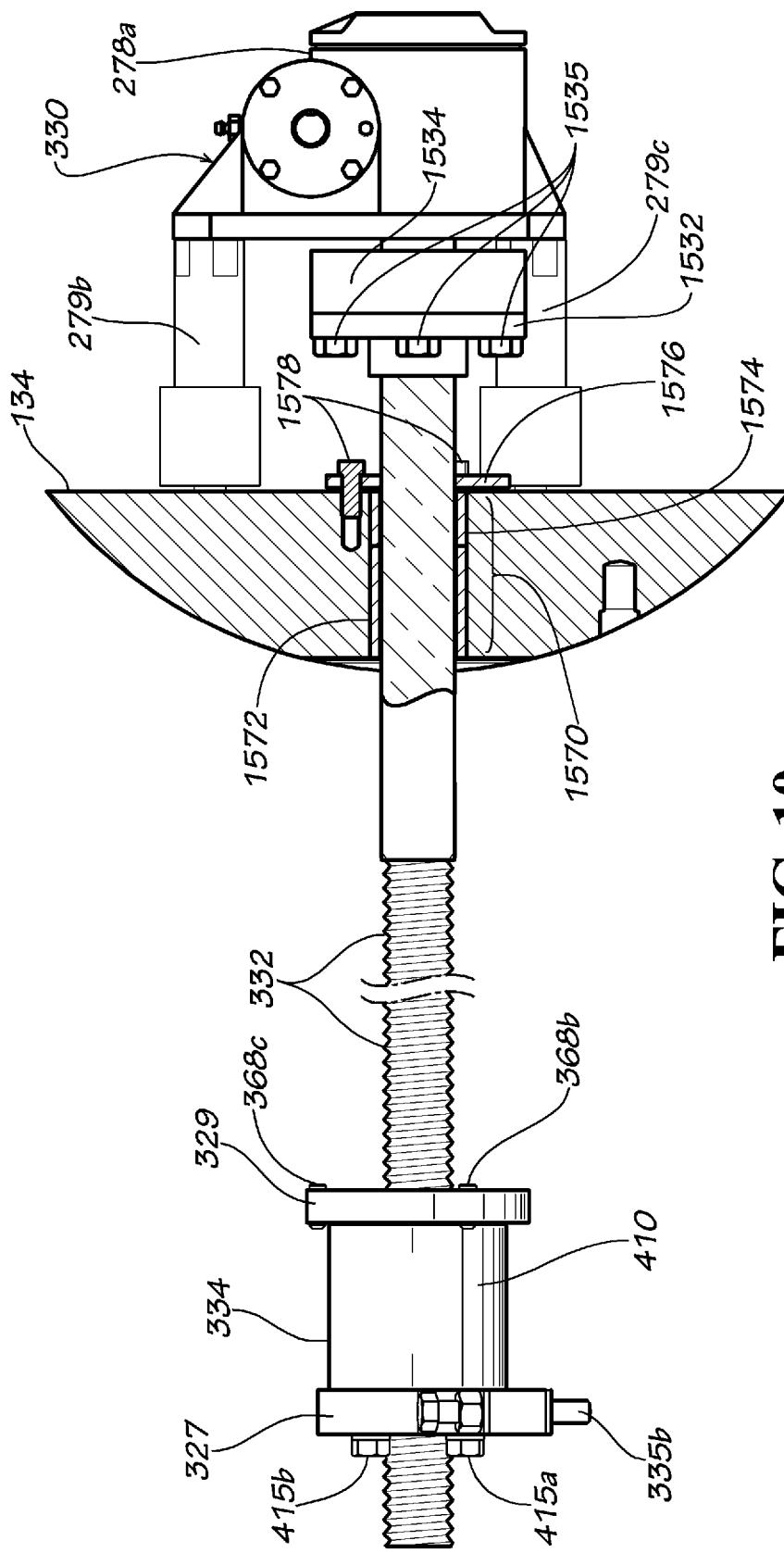
FIG. 10 is a cross-sectional view of the interior of the body cavity portion of the valve body of FIG. 1 including the drive line, gate, and sleeve valve, including an actuator located on an exterior of the sleeve valve.

As seen in FIG. 10, the drive line 330 includes the sync cam 334 and the drive shaft 332. The sync cam 334 is moveably positioned relative to the drive shaft 332. Drive line 340 is configured the same way as the drive line 330 in the current embodiment. Additionally, the drive shaft 332 is threaded over the entire area in which the sync cam 334 will longitudinally move along the drive shaft 332, which is cylindrical in the current embodiment. As can be seen in FIG. 10, the drive shaft 332 extends through a bore 1570, which itself extends through the flanged end 134 of the outlet portion 130 to be connected to the machine screw actuator 278a, which is mounted on the flanged end 134 of the outlet portion 130. The drive shaft 332 is connected to the machine screw actuator 278a by a drive shaft flange 1532 coupled to an actuator flange 1534 with a plurality of drive shaft flange bolts 1535, though the drive shaft 332 may be connected to the machine screw actuator 278a by any method in other embodiments. In the current embodiment, to seal the remainder of the bore 1570 surrounding the drive shaft 332, the bore 1570 includes a bearing 1572, a shaft packing seal 1574, a retainer plate 1576, and a plurality of bolts 1578 to hold the retainer plate 1576 in place.

Although it appears in the figure that there are two bearings, two shaft packing seals, and two retainer plates, there is actually only one of each because each of these are circular and extend entirely around the drive shaft 332 to seal the bore 1570, but this is not required. In the current embodiment, the bearing 1572 is made of bronze material, the shaft packing seal 1574 is made of rubber, and the retainer plate 1576 and the bolts 1578 are made of metal material. The material used and arrangement for sealing the bore 1570 in the disclosure and the current embodiment is not meant to be limiting, and one skilled in the art would know of other ways to seal the bore 1570. As can be seen in the current embodiment, the drive shaft 332 is coupled to the machine screw actuator 278a, which is coupled to the actuator motor 175 (as seen in FIG. 2). In the current embodiment, the machine screw actuator 278a enables the drive shaft 332 to rotate, translating rotational movement from the actuator motor 175 to the drive shaft 332. The machine screw actuator 278a, in the current embodiment, includes four actuator spacers 279a,b,c,d, which are coupled to the flanged end 134 of the outlet portion 130 and allow the machine screw actuator 278a to be positioned at a distance from the flanged end 134. Although the present disclosure includes a machine screw actuator 278a, such disclosure is not meant to be limiting and one of skill in the art would recognize other ways to enable to drive shaft 332 to rotate. Additionally, the actuator spacers 279a,b,c,d of the present disclosure are not meant to be limiting, and one of skill in the art would recognize that more or fewer actuator spacers could be used. Moreover, the machine screw actuator 278a could be separate from the drive shaft 332 or located in a different position relative to the sleeve valve 100. More than one of these configurations in FIG. 10 may be used for the sleeve valve 100. Additionally, in the current embodiment, drive line 340 also includes the same configuration as drive line 330 and the same actuator connection between the drive shaft 342 and the machine screw actuator 278b as drive line 330 does to machine screw actuator 278a. However, the configuration and actuator arrangement of drive line 340 is not required to be the same as drive line 330 and may be different in various embodiments. Moreover, as described above in FIG. 3, drive line 340 is included in the current embodiment, but it is not required.

Figure 11:
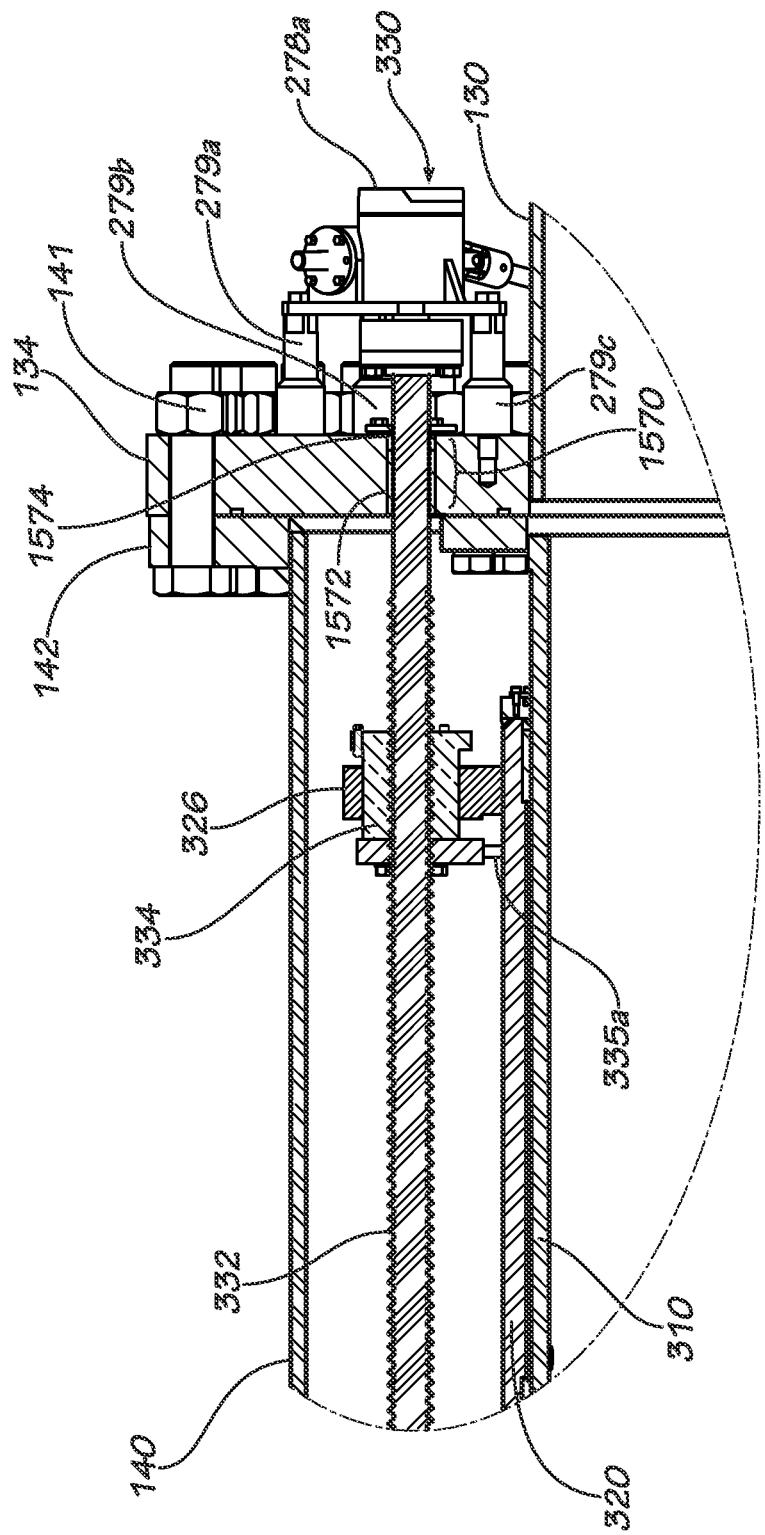
FIG. 11 is a side view of the drive line including the drive shaft, the sync cam, and the actuator located on an exterior of the sleeve valve, wherein the view of the drive shaft is abridged, showing only the front portion and the back portion of the drive shaft.

As seen in FIG. 11, a cross-sectional detail view of the interior of the body cavity portion 140 including the drive line 330, gate 320, and sleeve 310, is provided. In the current embodiment, the flanged end 134 of the outlet portion 130 is coupled to flanged end 142 of the body cavity portion 140.

Figure 12A:
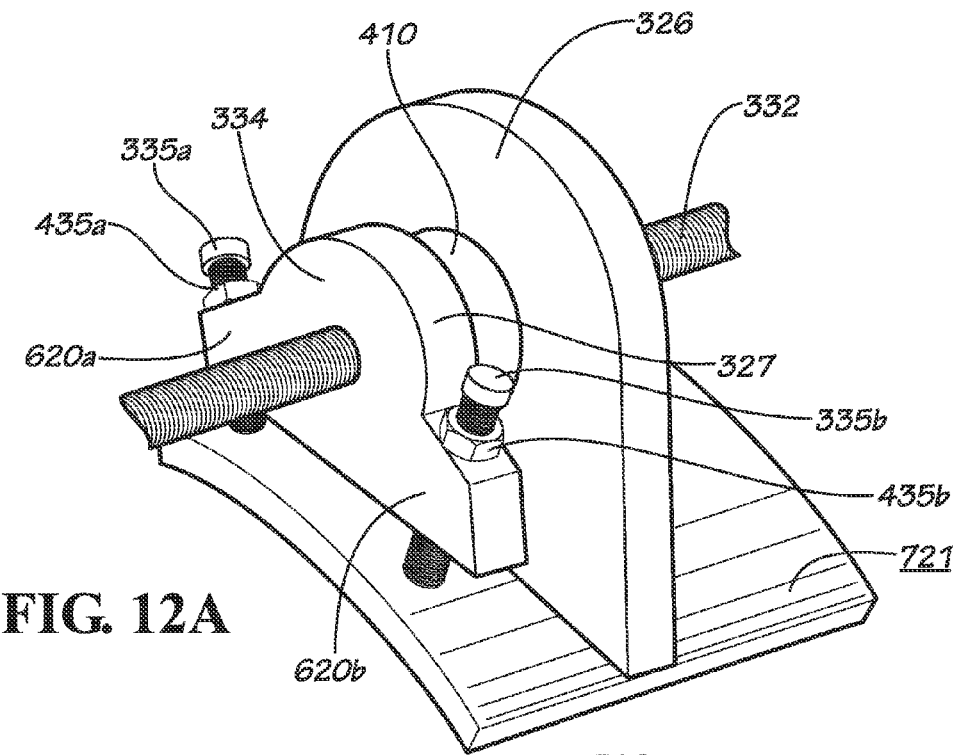
FIGS. 12A and 12B are perspective detail views of the drive line and gate of FIG. 10 and show the sync cam in a first position and a second position on the drive shaft, respectively.
Figure 12B:
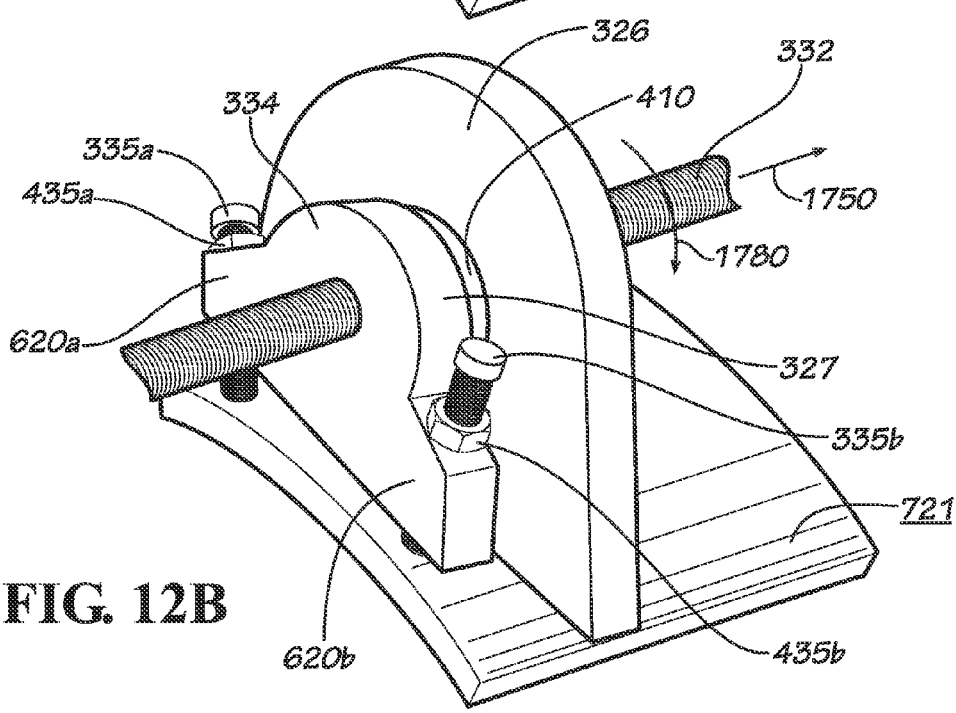

FIGS. 12A and 12B, show the sync cam 334, the cam stop 326, and the drive shaft 332 in isolation. In the current embodiment, the forward direction load balancing screws 335a and 335b of the sync cam 334 are initially balanced and contacting the gate surface 721 equally, as shown in FIG. 12A. Additionally, in the current embodiment, the forward direction load balancing screws 345a and 345b of the sync cam 344 are initially contacting the gate surface 721. In other embodiments, the forward direction load balancing screws 335a,b and 345a,b may contact another structure, including structures mounted on or formed on portions of the gate 320 or the cam stops 326,346. In the current embodiment, when the forward direction load balancing screws 335a,b are in contact with the gate surface 721 and the drive shaft 332 is thereafter turned, the sync cam 334 will move linearly with respect to the drive shaft 332 with either the front flange 327 or the back flange 329 moving towards the cam stop 326 depending on the direction the drive shafts 332 and 342 rotate. This movement takes place because the forward direction load balancing screws 335a,b, when in contact with the gate surface 721, prevent the sync cam 334 from rotating with the drive shaft 332, forcing the sync cam 334 to move linearly with respect to the drive shaft 332 due to the interaction of the threads of the drive shaft 332 with the drive shaft bore 416. In the current embodiment, the sync cam 344 moves linearly with respect to the drive shaft 342 in a similar manner.

As will be described in FIGS. 13A-E, during syncing of the current embodiment, when the front flanges 327,347 of the sync cams 334,344 are being synced to the cam stops 326 and 346, respectively, one of the front flanges 327 or 347 will contact its respective cam stop 326 or 346 first. In the current embodiment, in order to have the other front flange 327 or 347 contact its respective cam stop 326 or 346 simultaneously, the forward direction load balancing screws 335a and 335b (for front flange 327) or 345a and 345b (for front flange 347), can be adjusted to enable the non-contacting front flange 327 or 347 to move linearly along its respective threaded drive shaft 332 or 342. As can be seen in FIG. 12B, in the current embodiment, by turning the forward direction load balancing screw 335a,b, the sync cam 334 rotates about the drive shaft 332 and thereby moves linearly along the drive shaft 332 towards or away from the cam stop 326. By screwing forward direction load balancing screw 335a downward within lobe 620a and screwing forward direction load balancing screw 335b upward within lobe 620b, sync cam 334 is rotated clockwise in a direction 1780 and thereby moves in a direction 1750 along the drive shaft 332, as shown in FIG. 12B. Screwing forward direction load balancing screw 335a upward within lobe 620a and screwing forward direction load balancing screw 335b downward within lobe 620b rotates sync cam 334 counterclockwise and thereby moves the sync cam 334 in a direction opposite to direction 1750 along the drive shaft 332. In some embodiments, one forward direction load balancing screw 335a,b must be screwed upward before the other forward direction load balancing screw 335b,a can be screwed downward so that the sync cam 334 can be rotated. In some embodiments, to screw one of the forward direction load balancing screws 335a,b downward, the respective front nuts 435a,b must be screwed upward. In these embodiments, once the sync cam 334 is rotated to the correct position, both forward direction load balancing screws 335a,b must be screwed downward sufficiently to contact the gate surface 721 to prevent further rotation of the sync cam 334. In addition, in some embodiments, the front nuts 435a,b may be turned on the forward direction load balancing screws 335a,b to place each front nut 435a,b in contact with the respective lobes 620a,b to prevent movement of the forward direction load balancing screws 335a,b once the desired position of the forward direction load balancing screws 335a,b is achieved. In the current embodiment, the sync cam 344 is moved linearly with respect to the drive shaft 342 in a similar manner. The disclosure described above is not meant to be limiting, and one of skill in the art would recognize that there are other ways such tasks may be performed.

Figure 13A:
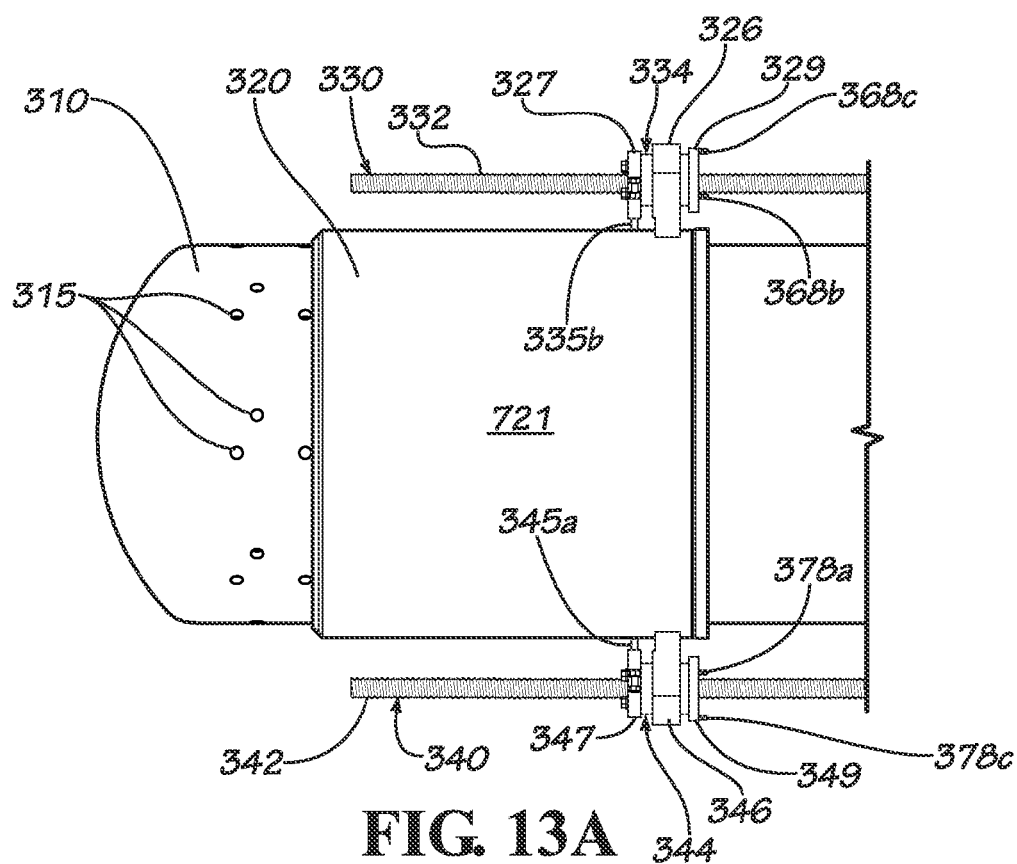
FIGS. 13A, 13B, 13C, 13D, and 13E show a side view of the drive assembly and gate of FIG. 12 and show a method for syncing the sleeve valve.

FIGS. 13A, 13B, 13C, 13D, and 13E show a syncing process for the sleeve valve 100. Syncing may be used to ensure that each drive line 330 and 340 is applying opening or closing force to the gate 320 at the same time and with the same degree of force, which will prolong the longevity of each drive line 330 and 340 and the actuator motor 175 and will ensure smooth opening and closing of the gate 320. In the current embodiment, syncing ensures that each drive line 330 and 340 is working the same amount by accounting for the machine tolerances in each of the drive lines 330 and 340, the cam stops 326 and 346, and the splitter 274. Syncing may occur during installation, but it can also be achieved, via the inspection ports 190a and 190b, later when the sleeve valve 100 is assembled. As seen in FIG. 13A, when syncing begins the sync cams 334 and 344 may be in a neutral position, meaning the forward direction load balancing screws 335a,b,345a,b are all equally screwed down to contact the gate surface 721 and neither the front flanges 327,347 nor the back flanges 329,349 of the sync cams 334,344 are touching the cam stops 326,346. However, the sync cams 334 or 344 are not required to begin in a neutral position.

Figure 13B:
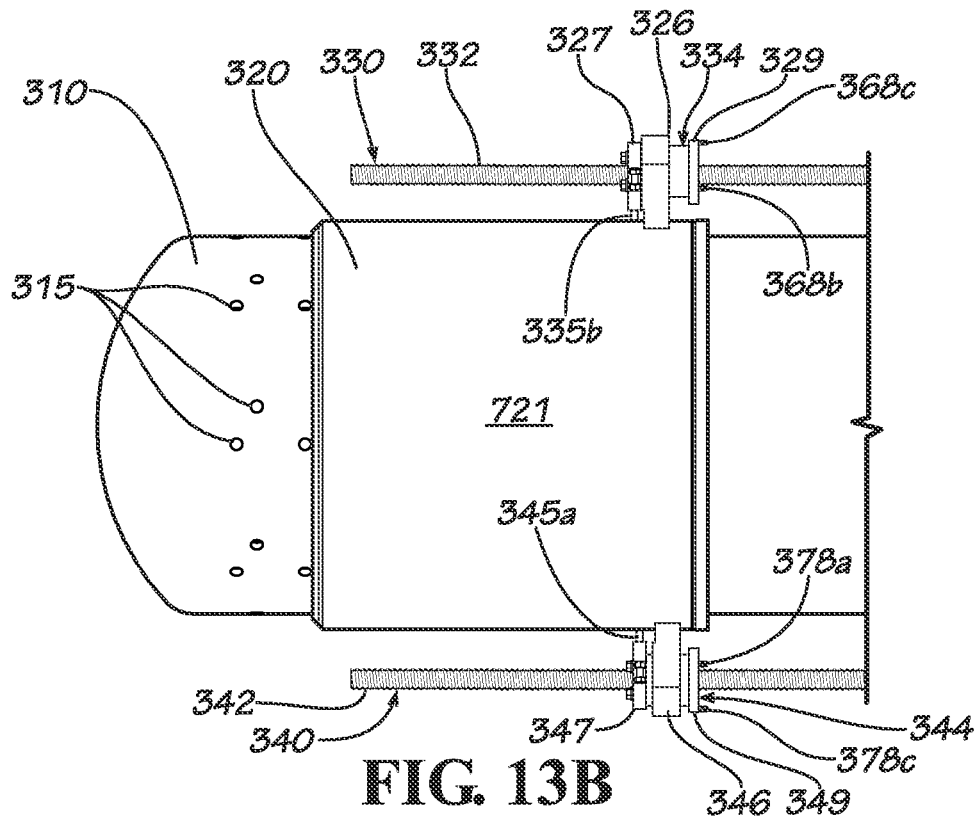
Figure 13C:
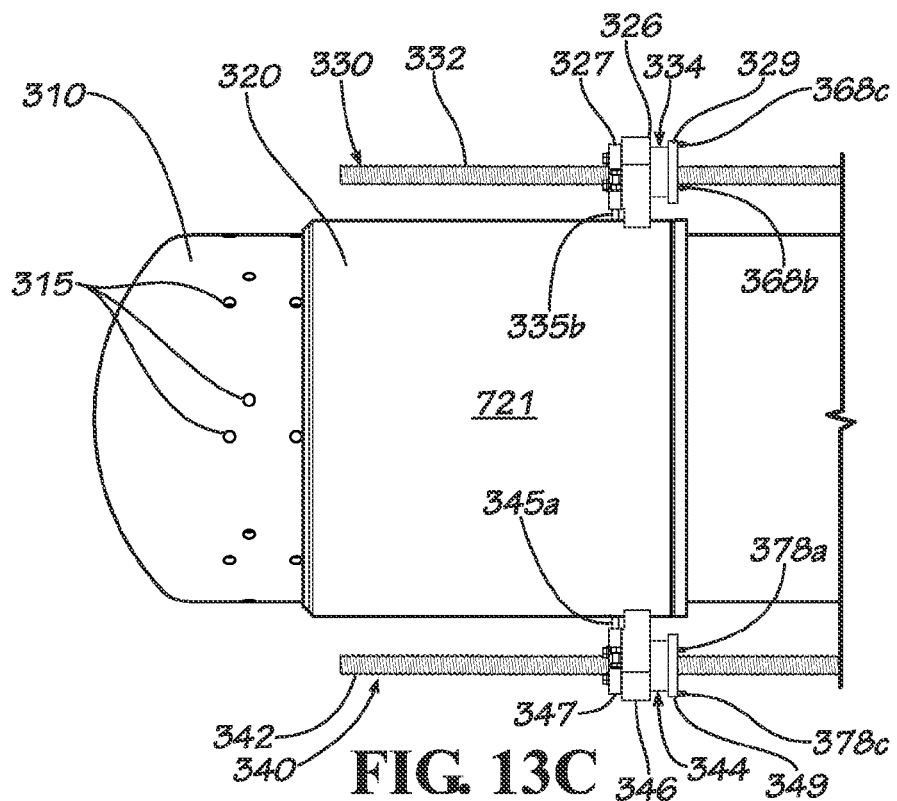

In the current embodiment, because the drive lines 330, 340 are both connected to a single actuator motor 175, the drive shafts 332,342 turn at approximately equal speeds and the sync cams 334,344 move linearly together along the drive shafts 332,342. In order to sync the sync cams 334 and 344 in a front stop position so that both front flanges 327,347 contact cam stops 326,346 simultaneously, as shown in FIG. 13C, the front flanges 327 and 347 are moved linearly together towards respective cam stops 326,346 so that at least one of the front flanges 327,347 contact a cam stop 326 or 346. As shown in FIG. 13B, the front flanges 327,347 may not contact the cam stops 326,346 simultaneously prior to syncing in the front stop position. Once one of the front flanges 327,347 contacts a cam stop 326 or 346, the non-contacting front flange 327 or 347 is moved linearly along its respective threaded drive shaft 332 or 342 so that both front flanges 327,347 contact the cam stops 326,346, as can be seen in FIG. 13C, stopping lobes 620a,b of the sync cam 334 and lobes 640a,b of the sync cam 344 against the gate 320. At this point, in FIG. 13C, the sync cams 334 and 344 are synced in the front stop position.

Figure 13D:
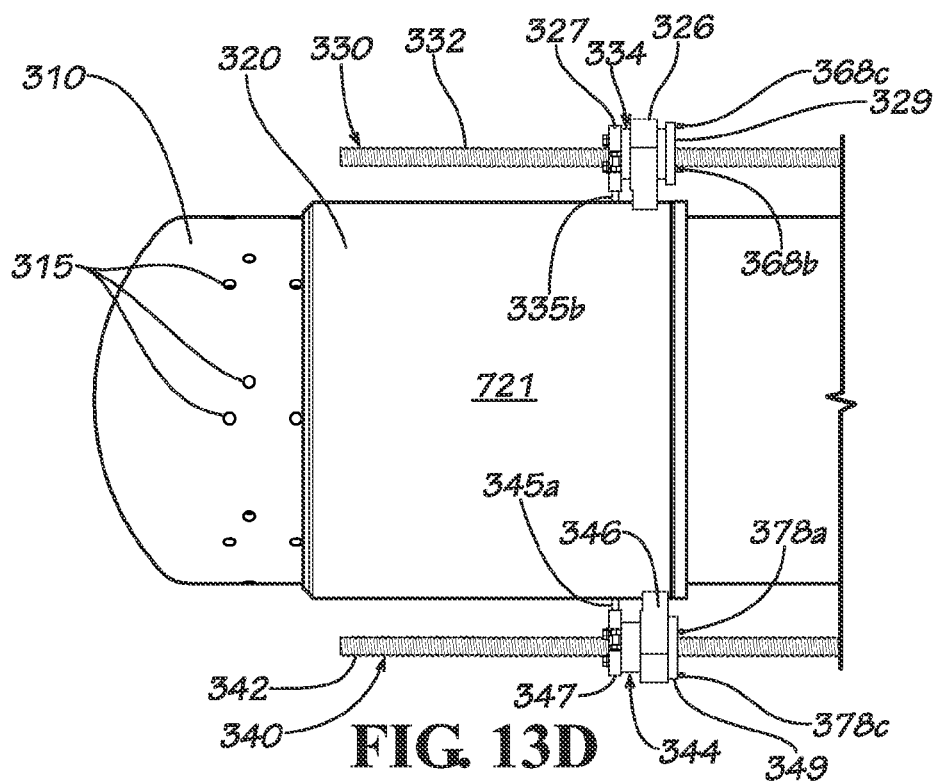
Figure 13E:
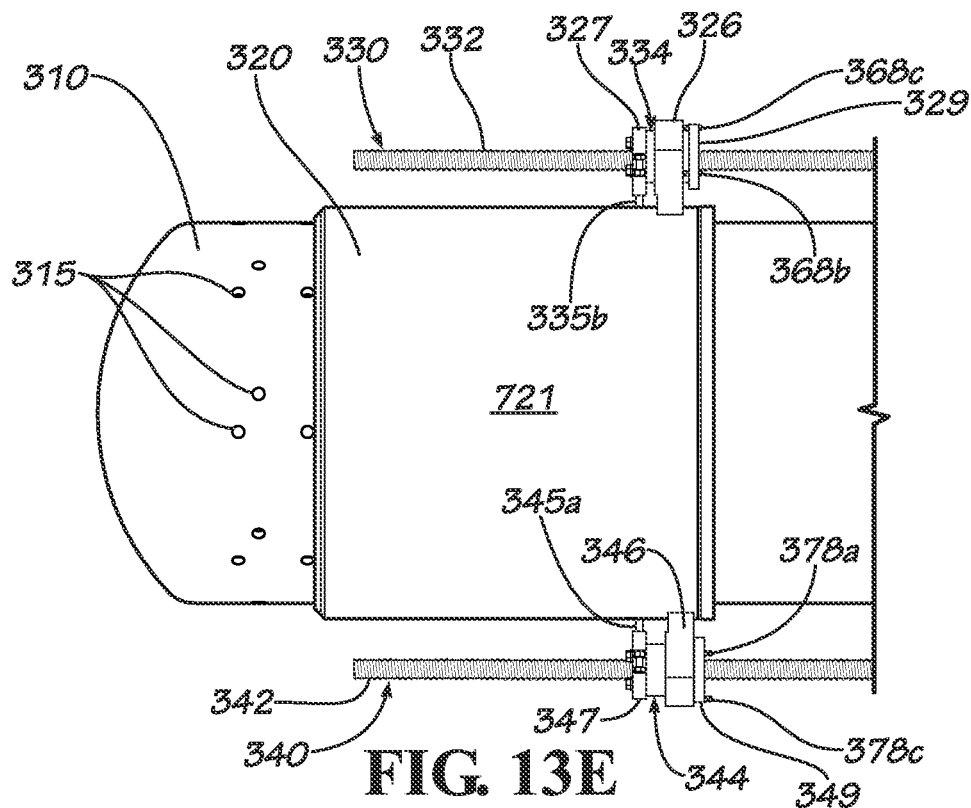

As seen in FIG. 13D of the current embodiment, to sync each sync cam 334 and 344 in the back stop position the back flanges 329,349 are moved linearly towards the cam stops 326,346 until at least one of the back flanges 329 and 349 contact its respective cam stop 326 or 346. The backward direction load balancing screws (368a,b,c or 378a,b,c) of the non-contacting back flange 329 or 349 are then turned to move the backward direction load balancing screws 368a,b,c or 378a,b,c towards the non-contacting cam stop 326 or 346 and into contact with the non-contacting cam stop 326 or 346. The non-contacting back flange 329 or 349 thereby effectively contacts its respective cam stop 326 or 346 by contacting the backward direction load balancing screws 368a,b,c or 378a,b,c with the non-contacting cam stop 326 or 346, as shown in FIG. 13E. In other embodiments, when the back flanges 329,349 are moved linearly towards the cam stops 326,346, at least one of the back flanges 329 and 349 contacting its respective cam stop 326 or 346 may include at least one of the cam stops 326 and 346 contacting at least one backward direction load balancing screw 368a, 368b, 368c, 378a, 378b, or 378c. In these embodiments, syncing the sync cams 334,344 in the back stop position includes placing each backward direction load balancing screw 368a,b,c and 378a,b,c in contact with the cam stops 326,346.

In the current embodiment, after syncing in the front stop position and syncing in the back stop position have occurred, syncing is complete. The disclosure described above is not meant to be limiting, and one of skill in the art would recognize that there are other ways such tasks may be performed.

Figure 14A:
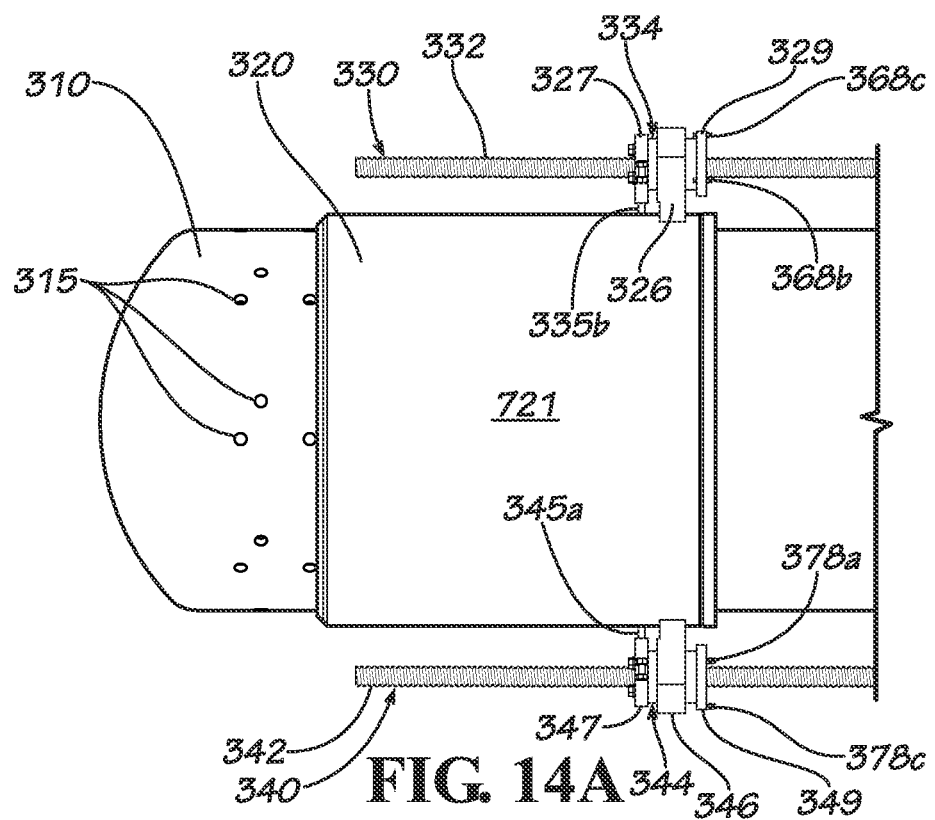
FIGS. 14A, 14B, 14C, 14D, and 14E show a side view of the drive assembly and gate of FIG. 12 and show a method for controlling the flow of fluid through the sleeve valve.
Figure 14B:
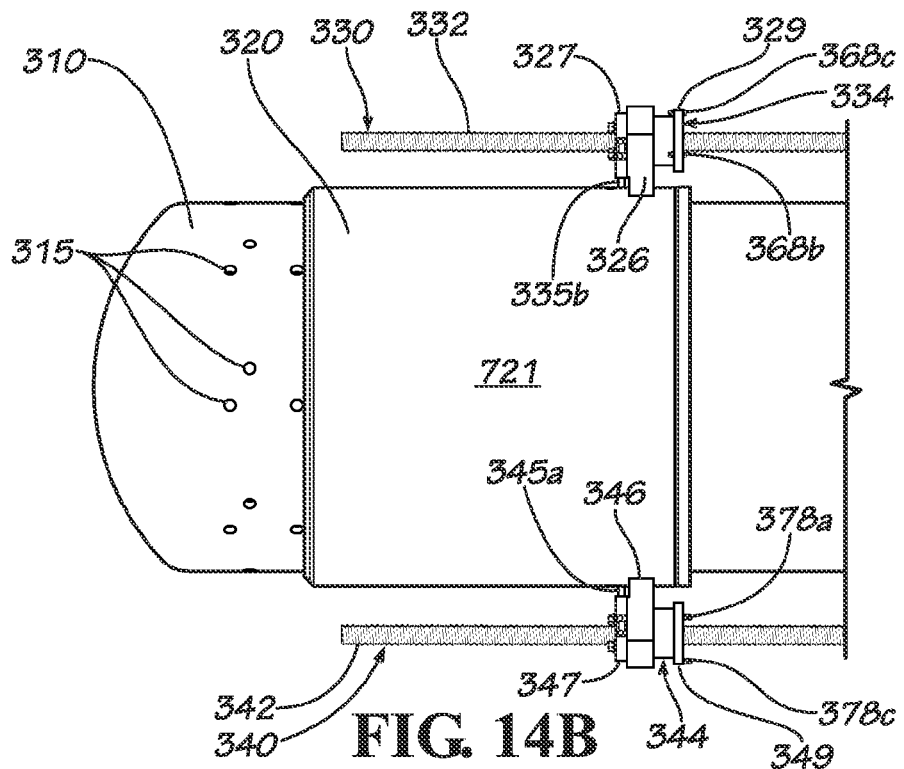
Figure 14C:
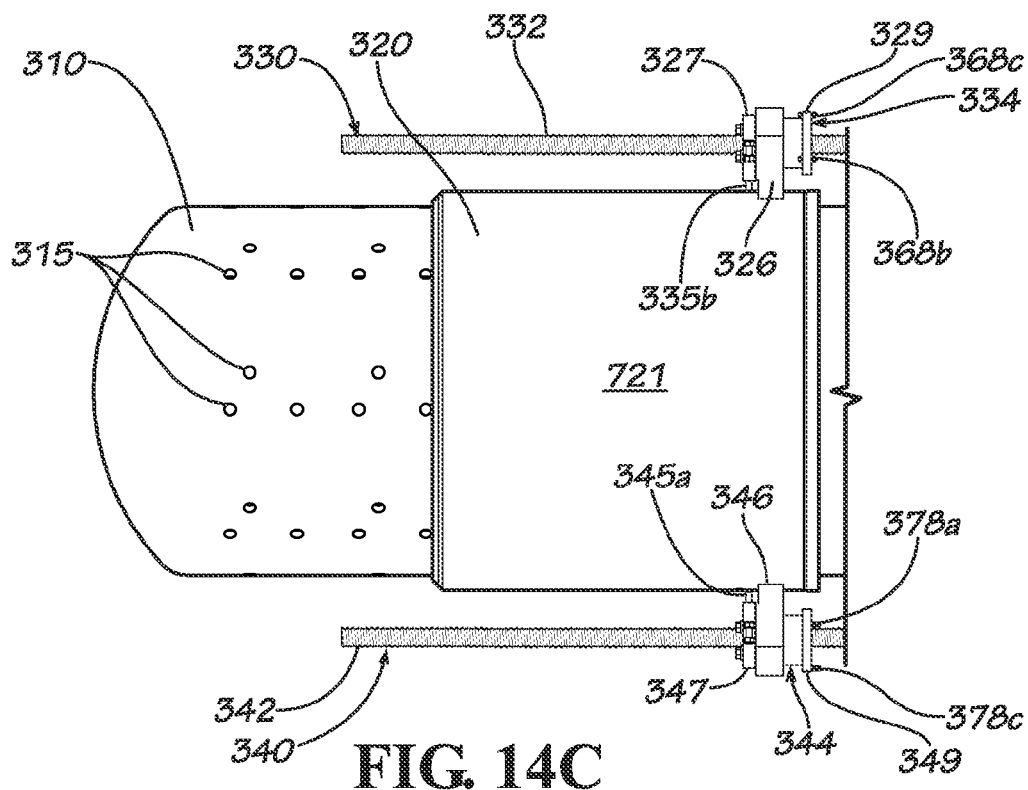

FIGS. 14A, 14B, 14C, 14D, and 14E show how the gate 320 moves in operation after syncing has occurred. FIG. 14A shows the sync cams 334 and 344 in neutral positions (as described in FIG. 13) and the gate 320 in a half open position. Neither the gate 320 nor the sync cams 334 and 344 must start in this position, and this position is merely described for purposes of example. In FIG. 14B of the current embodiment, the drive shafts 332,342 have been rotated in such a way that the front flanges 327,347 of the sync cams 334,344 are moved linearly along the drive shafts 332,342, respectively, toward the cam stops 326 and 346. If syncing in the front stop position has already occurred, then the front flanges 327 and 347 should contact their respective cam stops 326 and 346 at the same time. To ensure that the sync cams 334,344 do not rotate upon rotation of the drive shafts 332,342, the forward direction load balancing screws 335a,b and 345a,b should be screwed down into contact with the gate surface 721, though rotation the sync cams 334,344 may be prevented in other manners in other embodiments. As seen in FIG. 14C of the current embodiment, after the front flanges 327 and 347 contact their respective cam stops 326 and 346 and the drive shafts 332 and 342 continue to rotate in the same direction, the gate 320 is moved toward the open position (where more or all of the perforated openings 315 are exposed). In the open position, the gate 320 allows fluid to flow from the inlet 125 through the perforated openings 315 to the outlet 135. FIG. 14C shows the gate 320 in its most open position for the current embodiment.

Figure 14D:
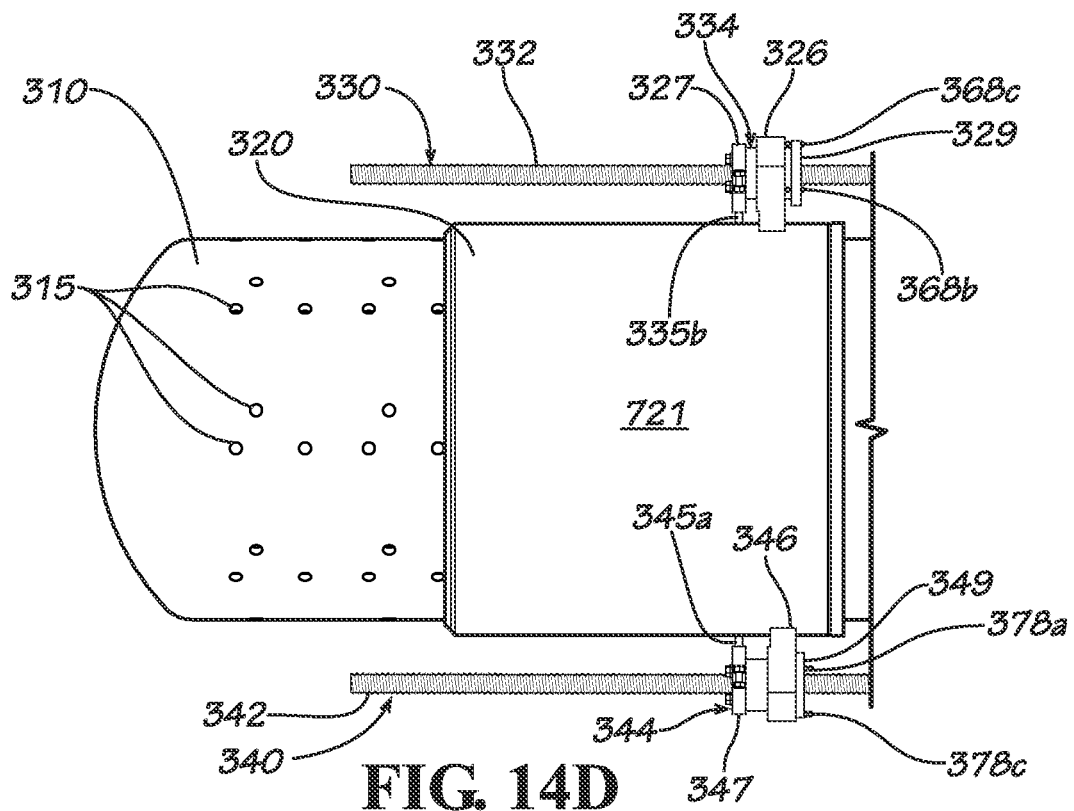
Figure 14E:
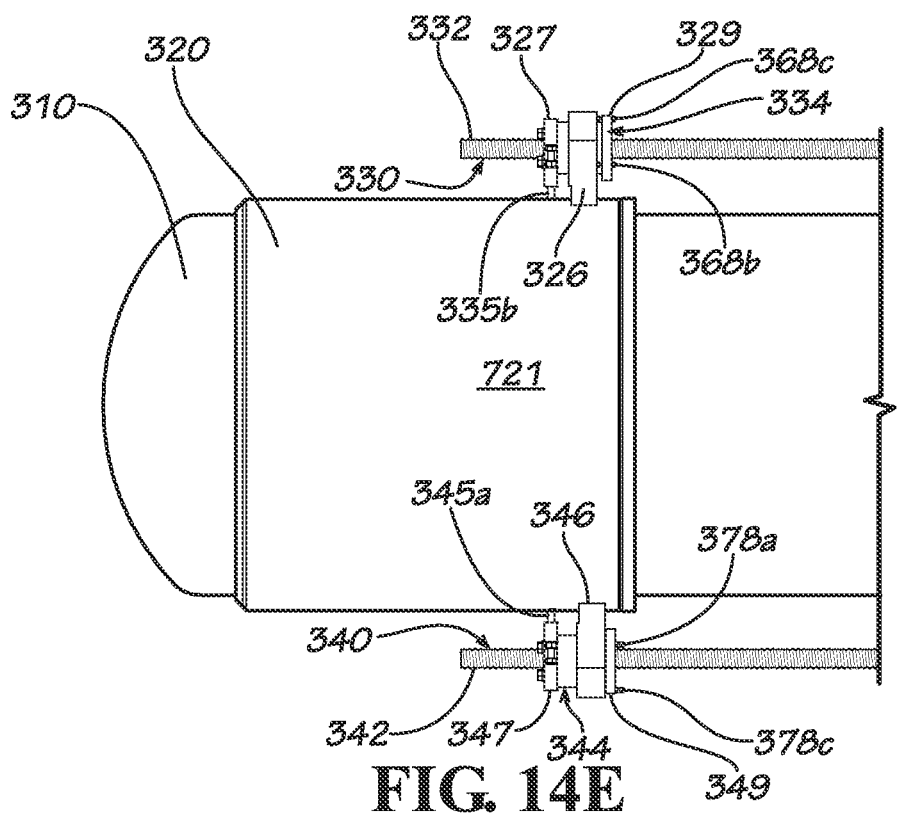

In FIG. 14D of the current embodiment, the drive shafts 332 and 342 have been rotated in such a way that the back flanges 329 and 349 of the sync cams 334 and 344 are moved toward the cam stops 326 and 346. If syncing in the back stop position has already occurred, then the back flanges 329 and 349 should contact their respective cam stops 326 and 346 at the same time (including effective contact between the cam stops 326,346 and the backward direction load balancing screws 368a,b,c or 378a,b,c, respectively). As seen in FIG. 14E of the current embodiment, after the cam stops 326 and 346 contact their respective back flanges 329 and 349 (or effectively contact the backward direction load balancing screws 368a,b,c or 378a,b,c) and the drive shafts 332 and 342 continue to rotate in the same direction, the gate 320 is moved toward the closed position (where more or all of the perforated openings 315 are covered). In the closed position, the gate 320 restricts fluid flow from the inlet 125 through the perforated openings 315 to the outlet 135. FIG. 14E shows the gate 320 in its most closed position for the current embodiment. In these embodiments, space between the cam stops 326,346 and the respective front flanges 327,347 and back flanges 329,349 operates to allow the sync cams 334,344 to "hammer" the gate 320, thereby budging the gate 320 from its resting position. With this arrangement, the gate 320 may be more easily moved by the sync cams 334,344 than if it were arranged with little or no space between the cam stops 326,346 and the respective front flanges 327,347 and back flanges 329,349 because the sync cams 334,344 gain momentum and hit the respective cam stops 326,346 with an inertia that provides additional force than if no inertia was present. This "hammer" effect may also dislodge the gate 320 in circumstances where the gate 320 gets stuck on the sleeve 310.

Figure 15:
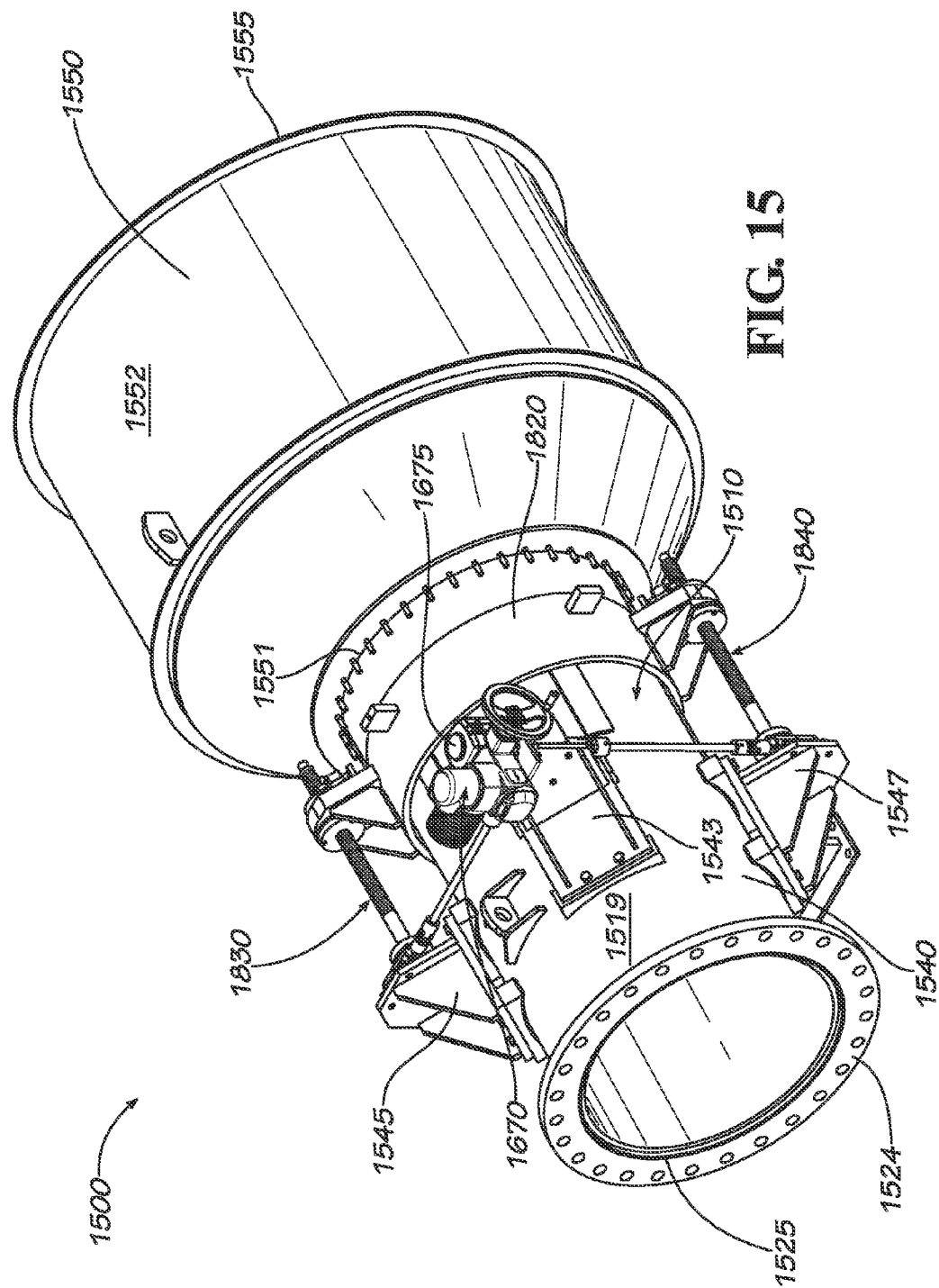
FIG. 15 is a perspective view of a fixed cone valve in accord with one embodiment of the current disclosure.

FIG. 15 shows a perspective view of a second embodiment of a valve of the present invention in the form of a fixed cone valve 1500. The fixed cone valve 1500 includes a valve body 1510 that has an inner surface 1517 (shown in FIG. 18) and an outer surface 1519. The inner surface 1517 and the outer surface 1519, as illustrated in the current embodiment, define a body cavity portion 1540 and an inlet 1525. The fixed cone valve 1500 also may include a hood 1550 coupled to the body cavity portion 1540. The hood 1550 includes a hood outer surface 1552 and a hood inner surface 1554 (shown in FIG. 18) defining a hood inlet 1551 and a hood outlet 1555. The body cavity portion 1540, in the current embodiment, is of an approximately cylindrical shape. The shape of the body cavity portion 1540 is not limiting and may be other shapes. The body cavity portion 1540 and the hood 1550 in the current embodiment are made of welded fabricated carbon steel plates, although one of skill in the art would recognize that other materials could be used and such a disclosure is not limiting. The body cavity portion 1540 may also include a flanged end 1524 at the inlet 1525. The fixed cone valve 1500 also includes a gate 1820, which is moveable over a portion of the body cavity portion 1540. The fixed cone valve 1500 also includes a drive assembly 1670 including an actuator motor 1675 in the form of a manual handwheel 1672 mounted on a motor mount 1543 and drive lines (1830 and 1840 in FIG. 18) mounted on drive line mounts 1545,1547, respectively.

Figure 16:
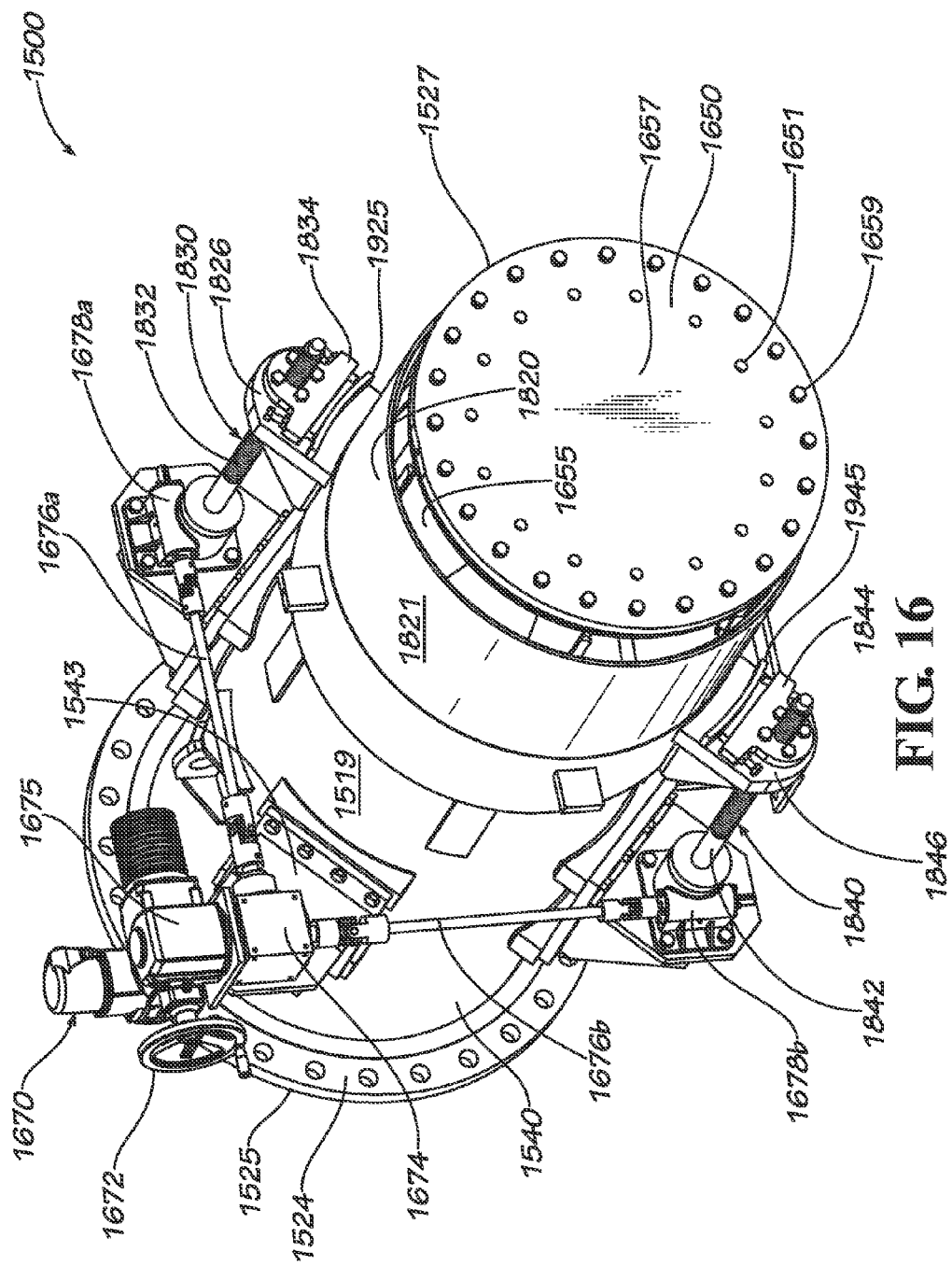
FIG. 16 is a perspective view from another end of the fixed cone valve of FIG. 15 with a hood of the fixed cone valve removed.

FIG. 16 displays a perspective view of the fixed cone valve 1500 with the hood 1550 removed. FIG. 16 shows that the valve body 1510 includes a cone 1650 mounted opposite from the inlet 1525 at a body cavity outlet 1527. The cone 1650 is mounted to the body cavity portion 1540 via a plurality of mounting fins 1655 and includes a cone plate 1657 mounted to the cone 1650 by a plurality of fasteners 1659. The cone plate 1657 also includes a plurality of hood mounting holes 1651 by which the hood 1550 is mounted to the cone 1650. FIG. 16 also shows that the gate 1820 has a gate surface 1821.

FIG. 16 also shows drive lines 1830,1840 and gate 1820 in more detail. Drive line 1830 includes drive shaft 1832 and sync cam 1834. Drive line 1840 includes drive shaft 1842 and sync cam 1844. Gate 1820 includes cam stops 1826, 1846 in the form of stop plates, though other cam stops may be used in other embodiments. Cam stop 1826 includes an adjustment ledge 1925, and cam stop 1846 includes adjustment ledge 1945.

As can be seen in the current embodiment, the actuator motor 1675 is mounted to the outer surface 1519 of the body cavity portion 1540 by motor mount 1543, although the actuator motor 175 may be mounted to any portion of the fixed cone valve 1500. The actuator motor 1675 is connected to the drive lines 1830 and 1840 by a splitter 1674, or three-way gear, and two actuator drive shafts 1676a and 1676b extending from the splitter 1674 to two separate machine screw actuators 1678a and 1678b, where actuator drive shaft 1676a is attached to machine screw actuator 1678a and actuator drive shaft 1676b is attached to machine screw actuator 1678b. Splitter 1674 translates rotational movement from the actuator motor 1675 to the actuator drive shafts 1676a,b, which translate rotational movement to each machine screw actuator 1678a,b, respectively. Machine screw actuator 1678a is part of drive line 1830 and machine screw actuator 1678b is part of drive line 1840. In the current embodiment, the machine screw actuators 1678a and 1678b are Duff-Norton Machine Screw Actuators, model number DM-9006; however, one of skill in the art would recognize that such a disclosure is not limiting and other types of machines or operations that enable the drive shaft 1832 and/or 1842 (described with reference to FIG. 18) to operate may be used. The drive assembly 1670 is operated by turning the handwheel 1672. The actuator motor 1675 may also be an electric motor in alternative embodiments. Drive line mounts 1545 mount machine screw actuator 1678a to the gate 1820 and drive line mounts 1547 mount machine screw actuator 1678b to the gate 1820, but the machine screw actuators 1678a,b may be mounted to the gate 1820 by any other types or amount of fasteners.

Figure 17:
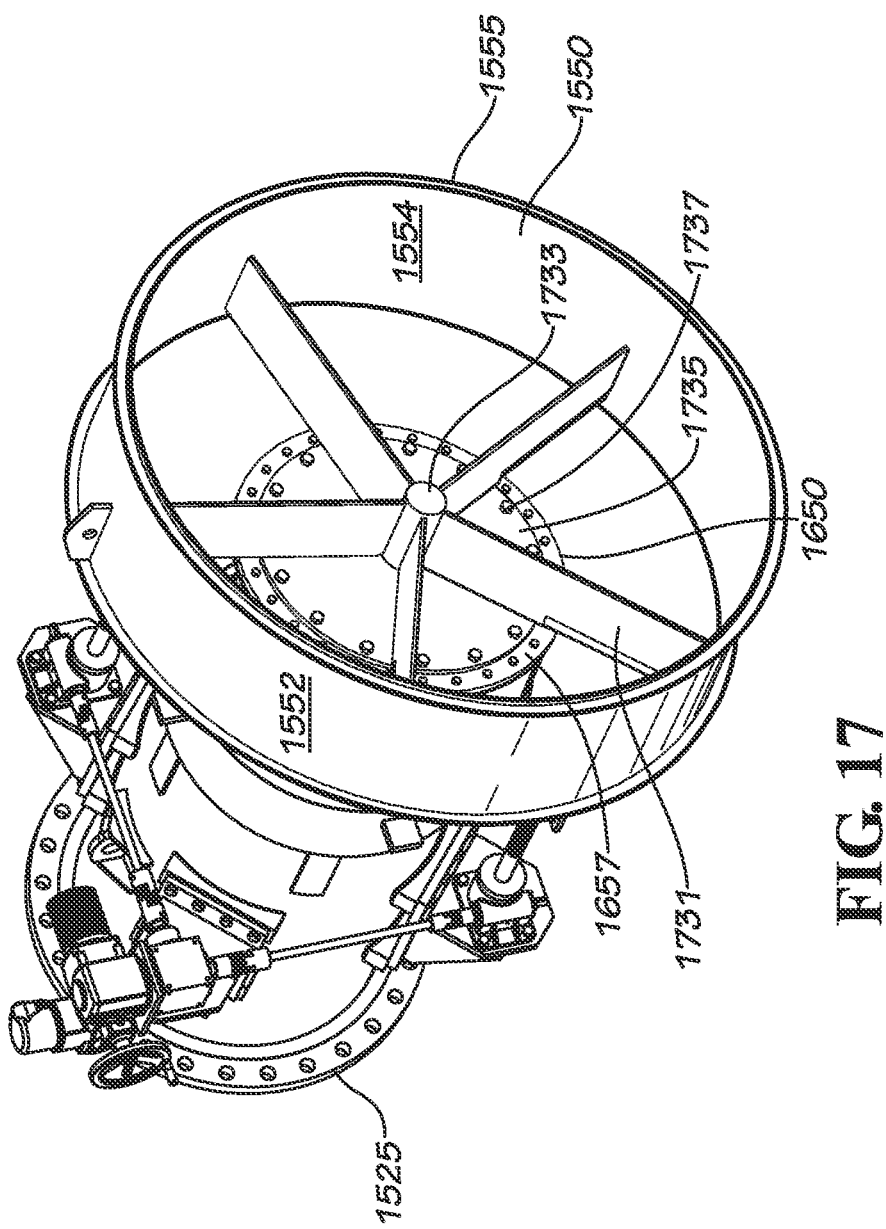
FIG. 17 is a perspective view from another end of the fixed cone valve of FIG. 15 with the hood of the fixed cone valve included.

FIG. 17 shows the perspective view of FIG. 16 of the fixed cone valve 1500 with the hood 1550 included. The connection between hood 1550 and cone 1650 is shown. Hood 1550 includes a plurality of vanes 1731 extending from the hood inner surface 1554 towards a hood mounting post 1733. The hood mounting post 1733 extends from a hood mounting plate 1735. The hood mounting plate 1735 is coupled to the cone plate 1657 by a plurality of hood mounting fasteners 1737 extending through hood mounting holes 1651. The hood 1550 may be mounted to the body cavity portion 1540 by any other method in other embodiments.

Figure 18:
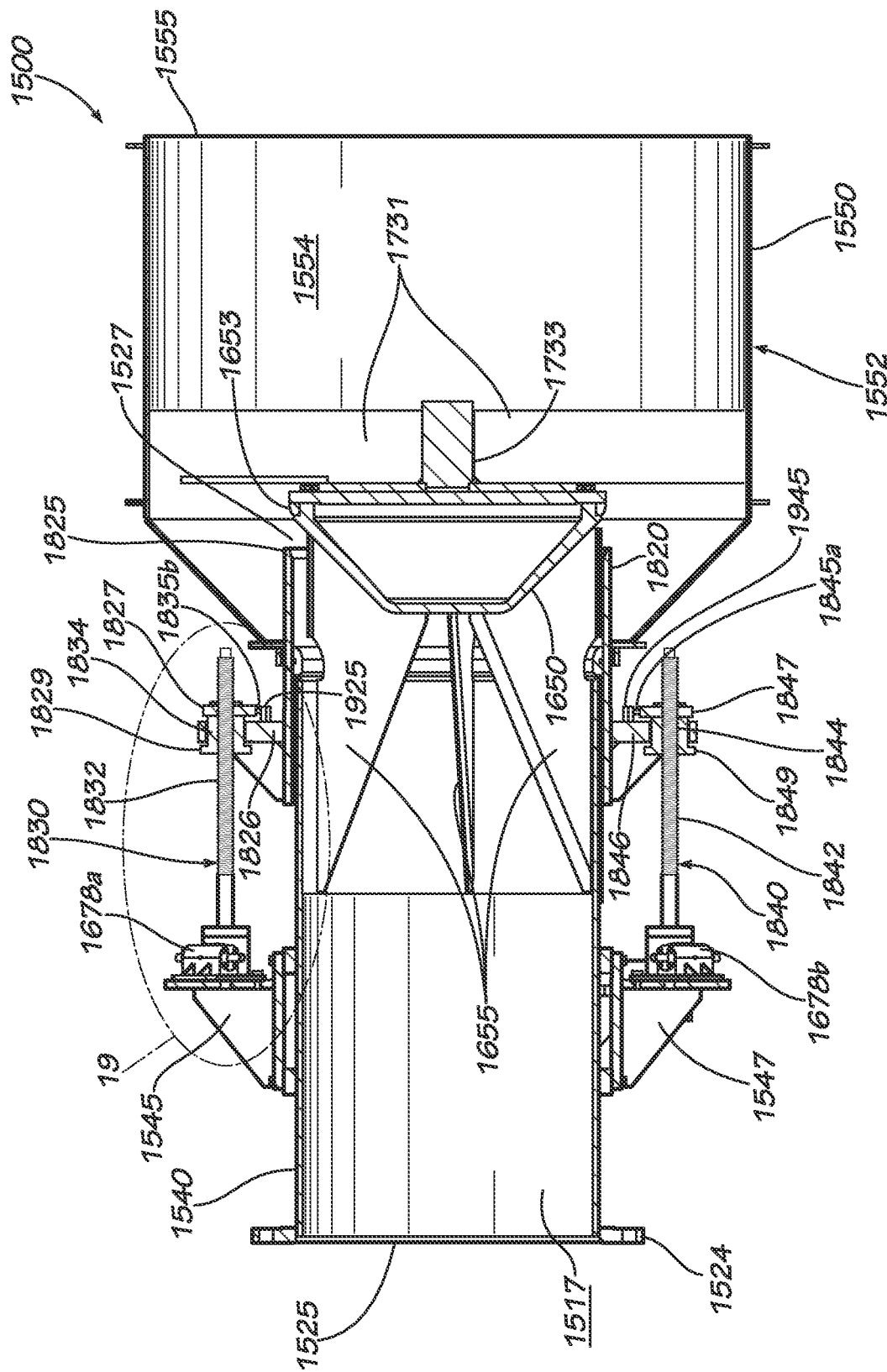
FIG. 18 is a cross-sectional view of the fixed cone valve of FIG. 15.

FIG. 18 provides a cross-sectional view of the fixed cone valve 1500. In the current embodiment, material flows into the inlet 1525 through a body cavity defined within the body cavity portion 1540 to the body cavity outlet 1527 around the cone 1650 and then through the hood 1550 to the hood outlet 1555. The gate 1820 is moveable over a portion of the valve body 1510 and is engageable with the cone 1650. The gate 1820 includes a gate sealing rim 1825 and the cone 1650 includes a cone sealing rim 1653. When the gate 1820 engages the cone 1650, the gate 1820 is placed in a closed position wherein the gate sealing rim 1825 contacts and sealably engages the cone sealing rim 1653, creating a fluid-tight seal the restricts material from flowing through the body cavity outlet 1527, effectively closing the body cavity outlet 1527. When the gate 1820 is moved away from the cone 1650, the gate 1820 is placed in an open position wherein the gate sealing rim 1825 disengages the cone sealing rim 1653 and allows material to flow through the body cavity outlet 1527, effectively opening the body cavity outlet 1527.

FIG. 18 also shows drive lines 1830 and 1840, which are similar in all respects to drive lines 330 and 340 of the sleeve valve 100. Sync cams 1834,1844 are moveably positioned around drive shafts 1832,1842, respectively. Sync cam 1834 includes front flange 1827 and back flange 1829, and sync cam 1844 includes front flange 1847 and back flange 1849. Front flange 1827 includes forward direction load balancing screws 1835a,b (1835a not shown) and front flange 1847 includes forward direction load balancing screws 1845a,b (1845b not shown). Drive lines 1830,1840 move gate 1820 axially in a similar manner to drive lines 330,340 of the sleeve valve 100, as described with respect to FIG. 14. Additionally, drive lines 1830,1840 are synced in a similar manner to drive lines 330,340 of the sleeve valve 100, as described with respect to FIG. 13.

The components of the drive line 1830, in the current embodiment, are not meant to be limiting. Additional components may be added to the drive line 1830 and the components in combination described above are not all required. In the current embodiment, an additional drive line 1840 is provided, although it is not required, and is located approximately 180 degrees from drive line 1830, though the drive line 1840 may be located relative to the drive line 1830 in any position in other embodiments. Drive line 1840, in the current embodiment, is configured in the same way drive line 1830 is configured. Further, cam stop 1846, in the current embodiment, is configured in the same way cam stop 1826 is configured.

Figure 19:
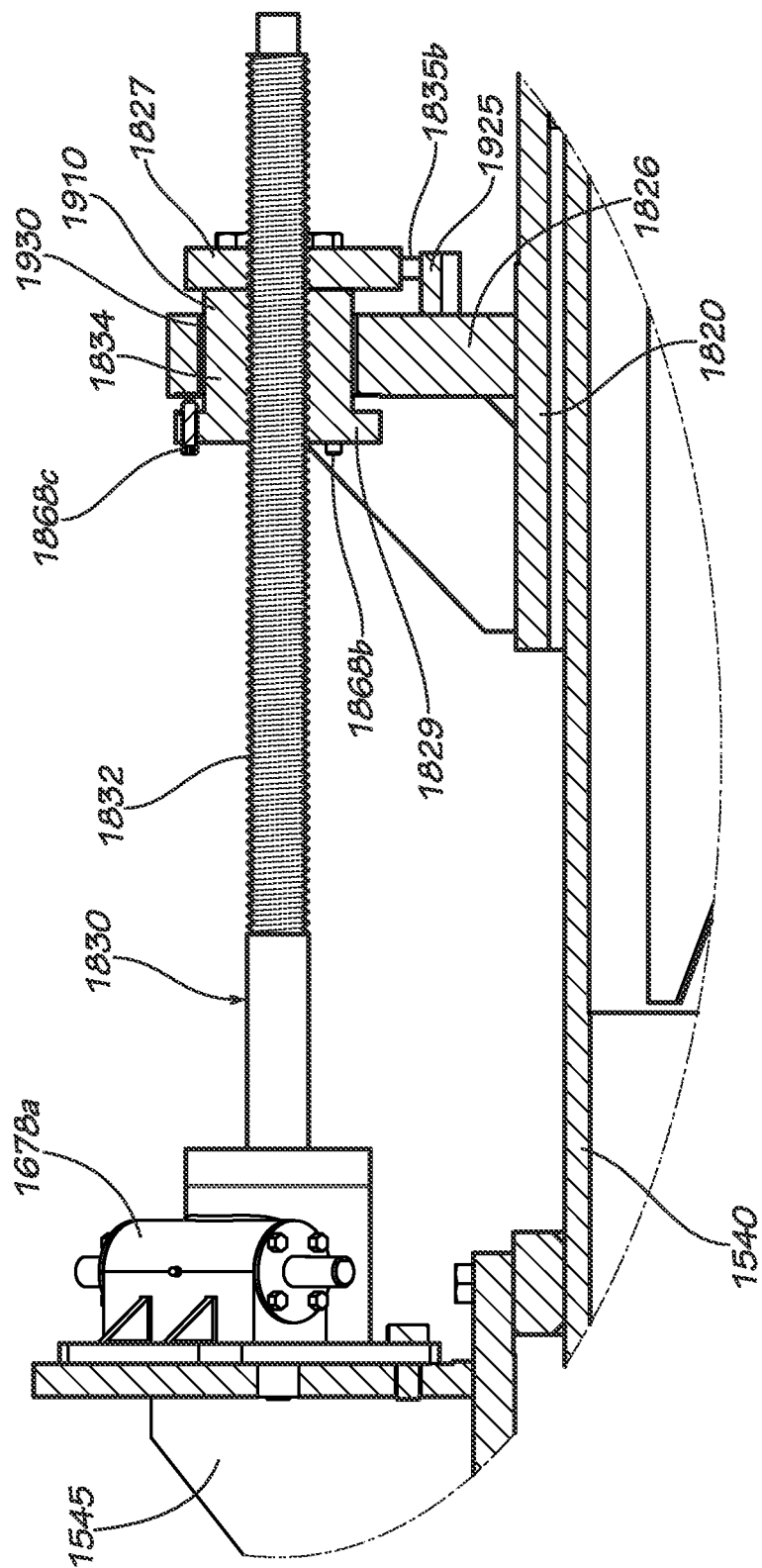
FIG. 19 is a cross-sectional detail view of the fixed cone valve of FIG. 15 including a drive line and a gate, including an actuator located on an exterior of the fixed cone valve.

FIG. 19 shows a detail view of the drive line 1830, gate 1820, and body cavity portion 1540. As seen in FIG. 19, the sync cam 1834, in the current embodiment, includes the front flange 1827, the back flange 1829, and a cylindrical middle portion 1910 extending between the front flange 1827 and the back flange 1829 and through the cam stop 1826, although the components of the sync cam 1834 are not critical. The sync cam 1834 also includes backward direction load balancing screws 1868a,b,c (1868a not shown) extending through the back flange 1829 similarly to backward direction load balancing screws 368a,b,c. In the current embodiment, sync cams 1834,1844 are configured similarly to sync cams 334,344 of the sleeve valve 100. Cam stop 1826 defines a cam bore 1930 having a diameter greater than the diameter of middle portion 1910 and through which middle portion 1910 extends. However, the diameter of cam bore 1930 does not permit front flange 1827 and back flange 1829 from traveling through cam bore 1930, thereby limiting the relative movement of the sync cam 1834 relative to cam stop 1826. Middle portion 1910, and therefore the distance between front flange 1827 and back flange 1829, is longer than the thickness of cam stop 1826.

In addition, FIG. 19 shows the adjustment ledge 1925 of cam stop 1826. Specifically, FIG. 19 shows that forward direction load balancing screws 1835a,b contact adjustment ledge 1925 instead of gate surface 1821. However, adjustment ledge 1925 prevents rotation of sync cam 1834 in a similar manner to gate surface 721 preventing rotation of sync cam 334 of sleeve valve 100. In other embodiments, forward direction load balancing screws 1835a,b may contact gate surface 1821 or any other structure that prevents rotation of sync cam 1834.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A valve comprising:
    a valve body having an inner surface and an outer surface, the inner surface and the outer surface defining an inlet, an outlet, and a body cavity between the inlet and the outlet;
    a gate movably coupled to the valve body and moveable over a portion of the valve body at least partially between the inlet and the outlet, the gate including a cam stop; and
    a drive assembly, the drive assembly including a pair of drive lines, each drive line having a drive shaft, a first drive line of the pair of drive lines including a sync cam, the sync cam of the first drive line movably positioned on the drive shaft of the first drive line and positioned relative to the cam stop.

2. The valve of claim 1, wherein:
    the cam stop is a first cam stop and the sync cam is a first sync cam; and
    the valve further includes a second drive line of the pair of drive lines, the second drive line including a second sync cam, the second sync cam movably positioned on the drive shaft of the second drive line and positioned relative to the second cam stop.

3. The valve of claim 2, wherein the first sync cam includes a front flange and a back flange, a distance between the front flange and the back flange of the first sync cam being greater than a thickness of the first cam stop, the first sync cam movably positioned on the drive shaft of the first drive line with the first cam stop between the front flange and the back flange.

4. The valve of claim 3, wherein the second sync cam includes a front flange and a back flange, a distance between the front flange and the back flange of the second sync cam being longer than a thickness of the second cam stop, the second sync cam movably positioned on the drive shaft of the second drive line with the second cam stop between the front flange and the back flange.

5. The valve of claim 3, wherein the first cam stop further comprises an adjustment ledge extending perpendicularly outward from the first cam stop towards the front flange of the first sync cam.

6. The valve of claim 3, wherein the back flange of the first sync cam further comprises a backward direction load balancing screws adjustable to contact the cam stop.

7. The valve of claim 1, wherein the first drive line and a second drive line of the pair of drive lines are connected to an actuator motor.

8. The valve of claim 1, wherein the drive shaft of the first drive line includes threading, the sync cam engaging the threading of the drive shaft.

9. The valve of claim 8, wherein the pair of drivelines is connected to the actuator motor by a splitter.

10. The valve of claim 1, wherein a second drive line of the pair of drive lines is positioned on an opposite side of the gate from the first drive line.

11. The valve of claim 1, wherein the sync cam includes two lobes, each lobe extending from the sync cam a distance longer than a distance between the drive shaft and an outer surface of the gate.

12. The valve of claim 11, wherein the sync cam further comprises two forward direction load balancing screws, one forward direction load balancing screw disposed on each of the two lobes of the sync cam, the two forward direction load balancing screws adjustable to contact the gate.

13. The valve of claim 1, wherein the valve body includes a sleeve positioned within the body cavity between the inlet and the outlet, the sleeve including at least one opening, the gate moveable over a portion of the sleeve including the at least one opening.

14. The valve of claim 1, wherein the valve body includes a cone positioned at the outlet of the valve body, the gate sealably engageable with the cone.

15. The valve of claim 1, wherein each of the pair of drive lines further comprises a machine screw actuator connected to each of the pair of drive shafts.

16. The valve of claim 1, wherein the drive shaft is disposed completely external to the valve body.

17. The valve of claim 1, wherein the cam stop defines a cam bore and a portion of the sync cam extends through the cam bore.

* * * * *